(12) United States Patent
Vijayaraghavan

(10) Patent No.: US 11,900,339 B1
(45) Date of Patent: Feb. 13, 2024

(54) SYSTEMS AND METHODS FOR HYPERLEDGER-BASED PAYMENT TRANSACTIONS, ALERTS, AND DISPUTE SETTLEMENT, USING SMART CONTRACTS

(71) Applicant: VANTIV, LLC, Symmes Township, OH (US)

(72) Inventor: Ramesh Vijayaraghavan, Mason, OH (US)

(73) Assignee: Worldpay, LLC, Symmes Township, OH (US)

( * ) Notice: Subject to any disclaimer, the term of this patent is extended or adjusted under 35 U.S.C. 154(b) by 210 days.

(21) Appl. No.: 15/828,026

(22) Filed: Nov. 30, 2017

(51) Int. Cl.
*G06Q 20/40* (2012.01)
*G06Q 20/10* (2012.01)
*G06Q 20/38* (2012.01)
*H04L 9/06* (2006.01)
*G06Q 30/06* (2023.01)
*G06F 21/62* (2013.01)
*H04L 67/104* (2022.01)

(52) U.S. Cl.
CPC ............ *G06Q 20/10* (2013.01); *G06F 21/62* (2013.01); *G06Q 20/382* (2013.01); *G06Q 20/405* (2013.01); *G06Q 30/06* (2013.01); *H04L 9/0637* (2013.01); *H04L 67/104* (2013.01)

(58) Field of Classification Search
CPC ...... G06Q 20/10; G06Q 20/405; G06Q 30/06; G06Q 20/382; G06Q 20/4016; G06F 21/62; H04L 9/0637; H04L 67/104
See application file for complete search history.

(56) References Cited

U.S. PATENT DOCUMENTS

| 10,755,226 B1 * | 8/2020 | Robyak .............. G06K 7/10366 |
| 2002/0128981 A1 * | 9/2002 | Kawan ................... G06Q 20/10 |
| | | 705/67 |

(Continued)

FOREIGN PATENT DOCUMENTS

WO    WO-2011126323 A1 * 10/2011 ............. G06Q 30/02

OTHER PUBLICATIONS

"Dispute Resolution in Blockchain: Do You Need an Umbrella?", Bacon Lee, Mar. 7, 2017, Mondaq Business Briefing (Year: 2017).*

*Primary Examiner* — Neha Patel
*Assistant Examiner* — Duan Zhang
(74) *Attorney, Agent, or Firm* — Bookoff McAndrews, PLLC

(57) ABSTRACT

Decentralized computer systems and methods are disclosed for hyperledger-based payment transactions, alerts, and dispute settlement, using smart contracts. One method includes: receiving transaction information comprising transaction data of transaction attributes for a transaction for a good or service originating at a merchant; storing the transaction data of the transaction attributes for the transaction, in a smart contract generated or updated by a smart contract application; deploying the Smart contract into one or more blockchain networks, wherein at least one of the one or more blockchain networks; performing one or more iterations of enabling, using an inter ledger protocol, to transfer at least some of the transaction data of the transaction attributes of the transaction to another of the one or more blockchain networks, wherein each of the one or more blockchain networks serves one or more business functions of the transaction.

20 Claims, 12 Drawing Sheets

(56) References Cited

U.S. PATENT DOCUMENTS

| | | | | |
|---|---|---|---|---|
| 2002/0198830 A1* | 12/2002 | Randell | ............... | G06Q 20/047 |
| | | | | 705/40 |
| 2011/0112869 A1* | 5/2011 | Greak | ................... | G06Q 40/08 |
| | | | | 705/4 |
| 2012/0198369 A1* | 8/2012 | Sorin | ..................... | G06Q 10/10 |
| | | | | 715/763 |
| 2016/0254910 A1* | 9/2016 | Finlow-Bates | ....... | H04L 9/3268 |
| | | | | 713/158 |
| 2017/0046693 A1* | 2/2017 | Haldenby | ............ | G06Q 10/103 |
| 2017/0109735 A1* | 4/2017 | Sheng | ................... | H04L 9/3297 |
| 2017/0295023 A1* | 10/2017 | Madhavan | ........... | H04L 9/3247 |
| 2017/0371620 A1* | 12/2017 | Zhou | ....................... | G06F 3/167 |
| 2018/0005630 A1* | 1/2018 | May | ....................... | G06Q 20/20 |
| 2018/0006826 A1* | 1/2018 | Smith | ....................... | H04L 9/30 |
| 2018/0096360 A1* | 4/2018 | Christidis | .............. | G06Q 20/02 |
| 2018/0113752 A1* | 4/2018 | Derbakova | .......... | G06Q 40/025 |
| 2019/0220813 A1* | 7/2019 | Madisetti | ........... | G06Q 10/0833 |

\* cited by examiner

SYSTEMS AND METHODS FOR HYPERLEDGER-BASED PAYMENT TRANSACTIONS, ALERTS, AND DISPUTE SETTLEMENT, USING SMART CONTRACTS

FIELD OF DISCLOSURE

The present disclosure relates generally to the field of payment transactions and, more particularly, to hyperledger-based payment transactions, alerts, and dispute settlement, using smart contracts.

BACKGROUND

In current payment transactions between consumers ("cardholders" or "users") and merchants, it may be common for merchants and/or the respective acquiring institutions ("acquirers") of the merchants to have a dispute over a term of the payment transaction with consumers and/or and the issuing institutions ("issuers") of the consumers. Currently, the process for resolving these disputes may rely on the payment network as an intermediary for dispute resolution process. While this process ("network dispute resolution process") may be the current approach to resolve disputes and/or chargebacks between the cardholder and merchants, the process may be complicated, lengthy, and cumbersome for both the issuers, consumers, merchants, and/or acquirers. In the network dispute resolution process, the consumer (e.g., "cardholder") may initiate the dispute by contacting the consumer's issuer, and then the issuer may check for risk and/or fraud associated with the payment transaction and submit the dispute to the payment network. Subsequently, the payment network may dispatch the dispute/chargeback to the merchant for acceptance and/or representment.

In the event that the parties to the dispute (e.g., consumer, issuer, merchant, acquirer, etc.) cannot agree after several attempts at the network dispute resolution process, one of the parties may resort to arbitration, which may be an expensive process in which the payment network arbitrates and decides on liability. Thus, there is a desire for a system and method for enabling consumers and their issuers to resolve disputes with merchants and their respective acquirers in a dispute resolution process that is efficient and reduces costs for parties by working collaboratively outside the payment network in a manner that benefits the involved parties.

In using the payment network as an intermediary, the current network dispute resolution process is also cumbersome, lengthy, and dependent on the rules set by payment networks. Payment network specific dispute rules may cause costly charges to acquirers and merchants to comply with the frequent changes in payment networks or their rules. There may be an increase in fraudulent and invalid claims due to intermediaries in the process. Thus, there is also a desire for a dispute resolution process that is transparent and standardized, but which also reduces risks and incidents of fraud. This information could be used by the merchants to proactively stop the fulfillment of goods and services associated with fraudulent accounts at the time of the transaction. Additionally, there is a desire for a user interface system and method that may analyze various transaction information stored in the blockchain. Furthermore, since updates and/or changes to information within blockchains may not be automatically deliverable to interested parties, there is a desire for a system and method that delivers and/or processes information from blockchain, while updating the blockchain based on input from the interested parties.

Payment transaction may involve multiple parties, e.g., financial institutions, merchants, consumers, governmental bodies, etc. Each party or group of parties may play a role or function in a transaction process but the role or function need not require all transaction information. There may be a risk that confidential or private information may be inadvertently circulated to parties of a transaction for whom there is no need for the information. Thus there is a desire for a system and method that better manages the flow and/or redaction of information among members of a transaction who may serve different roles or functions during the transaction or dispute settlement.

SUMMARY

According to certain aspects of the present disclosure, systems and methods are disclosed for efficient transaction dispute management using blockchain.

In one embodiment, a computer-implemented method is disclosed for hyperledger-based payment transactions, alerts, and dispute settlement, using smart contracts. The method comprises: receiving transaction information comprising transaction data of transaction attributes for a transaction for a good or service originating at a merchant, wherein the transaction data includes entries for the transaction attributes of (1) an identifier of an issuer of a payment source account of a user for applying resources to the transaction, (2) an identifier of an acquirer of a payment account of the merchant for depositing the applied resources for the transaction, (3) the amount of resources to be applied to the transaction, and (4) an identification of the good or service transacted; storing the transaction data of the transaction attributes for the transaction, in data structures for transaction attributes of the transaction in a Smart contract generated or updated by a Smart contract application; deploying the Smart contract into one or more blockchain networks, wherein at least one of the one or more blockchain networks has a ledger that is accessible to at least some of the participants of the transaction, the participants comprising at least the user, the merchant, issuer of the payment source account of the user, and the acquirer of the payment account of the merchant; performing one or more iterations of enabling, using an inter ledger protocol, to transfer at least some of the transaction data of the transaction attributes of the transaction to another of the one or more blockchain networks, wherein each of the one or more blockchain networks serves one or more business functions of the transaction, and the one or more business functions includes recording transaction events, settling a dispute as to the transaction data of a transaction attribute, and the recording the transfer of resources.

In accordance with another embodiment, decentralized computer systems are disclosed for hyperledger-based payment transactions, alerts, and dispute settlement, using smart contracts. The system comprises: a data storage device storing instructions for hyperledger-based payment transactions, alerts, and dispute settlement, using smart contracts; a user interface; and a processor configured to execute the instructions to perform a method including: receiving transaction information comprising transaction data of transaction attributes for a transaction for a good or service originating at a merchant, wherein the transaction data includes entries for the transaction attributes of (1) an identifier of an issuer of a payment source account of a user for applying resources to the transaction, (2) an identifier of an acquirer of a payment account of the merchant for depositing the applied resources for the transaction, (3) the amount of resources to be applied to the transaction, and (4) an identification of the good or service transacted; storing the transaction data of the transaction attributes for the transaction, in data structures for transaction attributes of the transaction in a Smart contract generated or updated by a Smart contract application; deploying the Smart contract into one or more blockchain networks, wherein at least one of the one or more blockchain networks has a ledger that is accessible to at least some of the participants of the transaction, the participants comprising at least the user, the merchant, issuer of the payment source account of the user, and the acquirer of the payment account of the merchant; performing one or more iterations of enabling, using an inter ledger protocol, to transfer at least some of the transaction data of the transaction attributes of the transaction to another of the one or more blockchain networks, wherein each of the one or more blockchain networks serves one or more business functions of the transaction, and the one or more business functions includes recording transaction events, settling a dispute as to the transaction data of a transaction attribute, and the recording the transfer of resources.

In accordance with another embodiment, a non-transitory machine-readable medium is disclosed that stores instructions that, when executed by a blockchain applications server, causes the blockchain applications server to perform a method for hyperledger-based payment transactions, alerts, and dispute settlement, using smart contracts. The method includes: receiving transaction information comprising transaction data of transaction attributes for a transaction for a good or service originating at a merchant, wherein the transaction data includes entries for the transaction attributes of (1) an identifier of an issuer of a payment source account of a user for applying resources to the transaction, (2) an identifier of an acquirer of a payment account of the merchant for depositing the applied resources for the transaction, (3) the amount of resources to be applied to the transaction, and (4) an identification of the good or service transacted; storing the transaction data of the transaction attributes for the transaction, in data structures for transaction attributes of the transaction in a Smart contract generated or updated by a Smart contract application; deploying the Smart contract into one or more blockchain networks, wherein at least one of the one or more blockchain networks has a ledger that is accessible to at least some of the participants of the transaction, the participants comprising at least the user, the merchant, issuer of the payment source account of the user, and the acquirer of the payment account of the merchant; performing one or more iterations of enabling, using an inter ledger protocol, to transfer at least some of the transaction data of the transaction attributes of the transaction to another of the one or more blockchain networks, wherein each of the one or more blockchain networks serves one or more business functions of the transaction, and the one or more business functions includes recording transaction events, settling a dispute as to the transaction data of a transaction attribute, and the recording the transfer of resources.

In some embodiments, the non-transitory machine readable medium may be embedded into various nodes of the blockchain.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

DETAILED DESCRIPTION

Figure 1:
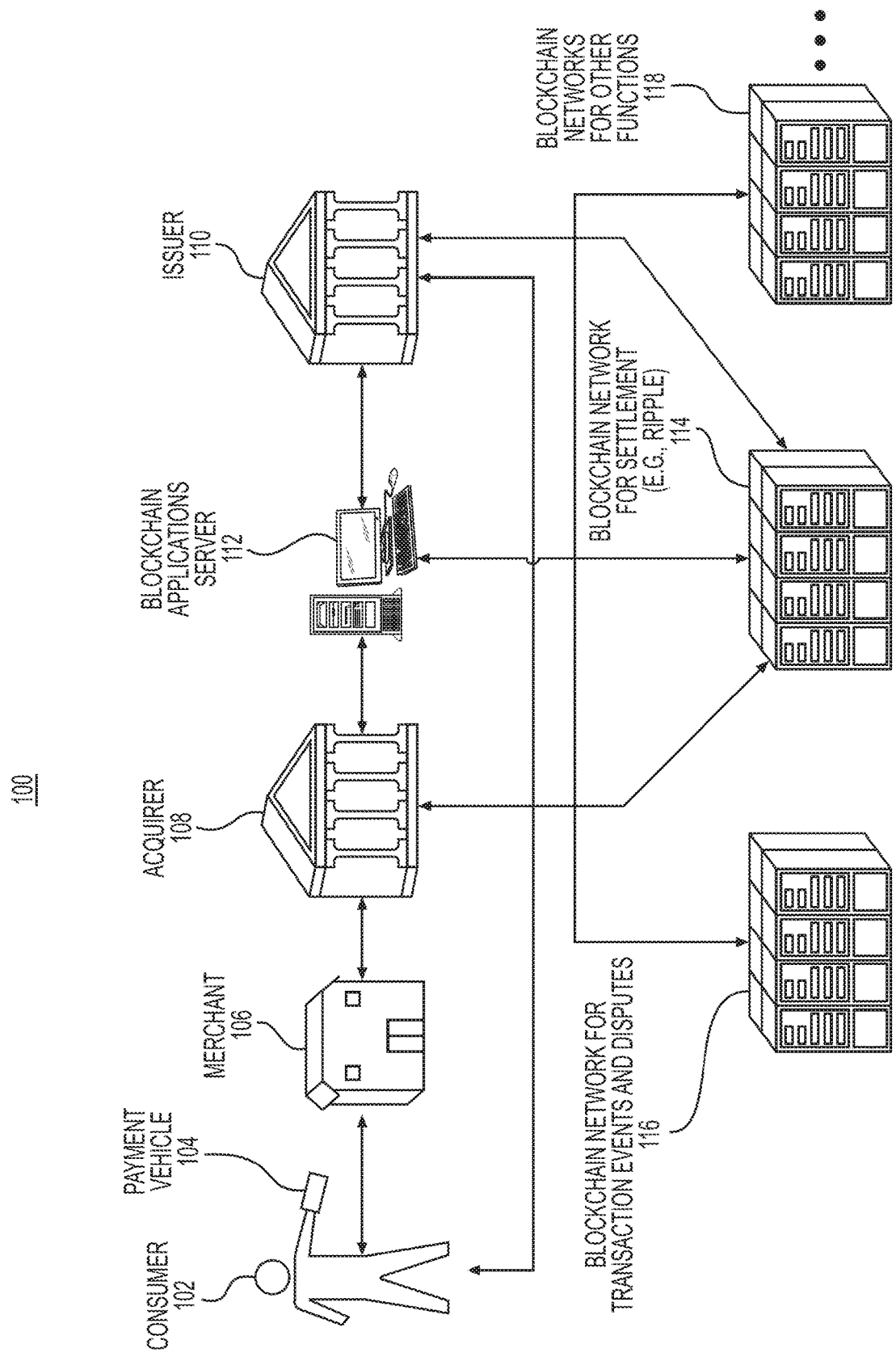
FIG. 1 depicts an environment for hyperledger-based payment transactions, alerts, and dispute settlement, using smart contracts, in accordance with non-limiting embodiments.

Various non-limiting embodiments of the present disclosure will now be described to provide an overall understanding of the principles of the structure, function, and use of systems and methods disclosed herein for hyperledger-based payment transactions, alerts, and dispute settlement, using smart contracts.

As described above, existing methods of resolving disputes in payment transactions, which use the payment network as a mediator, have proven to be complicated, lengthy, and cumbersome for issuers, consumers, merchants, and/or acquirers. Parties to a payment transaction may be burdened with making costly changes by having to comply with the frequent changes in payment networks and the rules used by the payment networks for resolving disputes. Furthermore, in replacing conventional payment networks, blockchain networks may need to comply with standards and regulations set for the payment industry. It is also contemplated that some participants in the business of or related to a payment transaction may not want to share all information or be privy to other participants in the business of or related to the business transaction. Therefore, there may be a need for multiple networks involved in the payment transaction process for various business or functions. Each network may have its own blockchain with member participants, and the blockchain networks may communicate with one another, for example, using inter ledger communication protocol.

Thus, the embodiments of the present disclosure are directed to a system and method for enabling consumers and their issuers to resolve disputes with merchants and their respective acquirers in a dispute resolution process that is efficient, transparent, and standardized (e.g., to account for multiple payment networks), reduces costs for parties, complies with existing regulations, minimizes risks and incidents of fraud, and processes a payment transaction, using multiple blockchains. In some embodiments, one blockchain may be responsible for functions of storing transaction information used for alerts and dispute settlements, whereas another blockchain (e.g., Ripple) may be used for the function of actually exchanging currency or cryptocurrency (e.g., Bitcoins, Litecoins, etc.) for the processing of the transaction. In various embodiments, a blockchain may refer to an open, distributed ledger (e.g., "shared permissioned ledger") that can record transactions between parties to a payment transaction efficiently and in a verifiable and a permanent way (e.g., by providing visibility or by being transparent to various participants of the blockchain). A blockchain may be operated by many different parties that come to share consensus. It may maintain a growing list of ordered records, called blocks. Each block may have a timestamp and a link to a previous block. Records may not be altered retroactively. A common analogy for a blockchain may be a digital network of safety deposit boxes. These boxes can secure any digital asset (e.g., currency, securities, loyalty points, contracts). Each box is locked with a crypto private key. The owner of the box can use their key to unlock the box and push a digital asset to another safety deposit box that is secured by the keys of the recipient. The recipient can then retrieve the digital asset from their safety deposit box.

A blockchain may include one or more of the following features. In some embodiments, a blockchain may include a database, and tabular schemes may be used to encode core data types on top of a traditional database. In such embodiments, tables may consist of blocks, which may be bundles of transactions. Furthermore, such embodiments may be configured so that blockchain transactions may be all or nothing. A blockchain may be rendered immutable, ensuring that the data stored in a block cannot be changed. Each block in the chain may include reference to the previous block, so in chains with a high rate of new transactions, the block may be securely linked to previous blocks. The block may also be replicated numerous times. Cryptography may ensure that users of a blockchain may only edit the parts of the blockchain that they "own" by possessing the private keys necessary to write to the file. Cryptography may also ensure that copies of the distributed blockchain are kept in sync. Distributed ledgers ("shared ledgers") may be used for transaction integrity. Thus, ledgers may be maintained by multiple independent entities on different computing devices. A consensus protocol may be followed by each entity to maintain a consistent view of the ledger. Distributed ledgers provide for greater resiliency against malicious attacks or system failures. Furthermore, a blockchain may be "permissioned"—e.g., allow access to only a specific set of participants. It is contemplated that it may be useful for financial applications to use distributed, centralized, permissioned, tokenless ledgers as a basis for the implementations of various systems and methods presented herein.

In some embodiments, there may be multiple blockchain networks, each taking on a role or function of a transaction process. The multiple blockchain networks may function as a hyperledger, and may be referred to as such, through the disclosure herein. Unlike a traditional blockchain model (e.g., as originally used for Bitcoin), a hyperledger may manage the admission of participants at its core, as a permissioned, shared ledger. Thus, the hyperledger may be an umbrella of blockchain networks, where one blockchain network may not need another blockchain network to perform its core functionality. However, within this hyperledger, one blockchain network may require an addressing system to communicate with other blockchain networks. For example, a blockchain network may use an addressing system to facilitate transactions on its ledger or to discover and utilize transactions or Smart contracts (e.g., chaincode) existing on ledgers of other blockchain networks. The addressing system may include, but are not limited to, accessing information from another blockchain network using a transaction identifier, an identifier of a participant of the transaction, an identifier of a payment source account of a participant of the transaction, an identifier of a smart contract involved with the transaction, etc.

In an exemplary hyperledger, one or more of the multiple blockchain networks may be assigned for the processing of a payment transaction that may involve an exchange of funds, currencies, and/or cryptocurrencies. In one embodiment, this blockchain network may be based on Ripple, which is a real-time gross settlement system (RTGS), currency exchange and remittance network enabling secure, instant, and cheap global financial transactions with no chargebacks. Ripple may support tokens representing fiat currency, crypto, currency, crypto currency, commodity, etc. Ripple may be based around a shared public blockchain and/or shared ledger, which may use a consensus process that may allow for payments to occur in a decentralized, distributed process.

In various embodiments of the present disclosure, "currency" may be used to refer to both fiat currency (e.g., dollars, pounds, euro, yen, rupees, etc.) or digital currency (e.g., Bitcoins, Litecoins, etc.)

Thus, various parties of a transaction (e.g., consumers, issuers, merchants, acquirers, etc.) may be a part of the Ripple network to be able to leverage this settlement system. In such embodiments, blockchain networks used for the processing of the payment transaction, like Ripple, may be designed to comply with risk, privacy and compliance requirements and specifically designed for financial services industry with a number of banks/financial institutions already in the network.

While Ripple is used as an example blockchain network or platform to serve the function of the settlement or transfer of funds, currency, ad/or cryptocurrency, it is contemplated that similar blockchain networks that provide the benefits described above may be used.

The use of blockchain may have a long term impact on the financial services industry in paring down transaction settlement time from days to minutes and minimizing the need for intermediaries. Furthermore, it may enable point to point exchanges of digital assets without a need for trust between the parties in the exchange. This may reduce the need for third party engagement in transactions and may reduce the cost involved in verifying a transaction.

As applied to at least some embodiments presented herein, a blockchain having a shared permissioned ledger may be available to participants and may provide visibility to the participants of the blockchain, which may be the parties of a payment transaction initiated by a consumer and originating at a merchant. These parties may include, but are not limited to, the consumer, the merchant at which the transaction originates, the merchant's acquiring bank or institution, and the issuing institution or bank of the consumer. The ledger of one or more of the blockchain networks may be programmed to trigger transactions or resolve disputes based on the payment transaction automatically (e.g., via Smart contracts). Thus, the use of blockchain networks for e.g., record keeping and dispute resolution of payment transactions ("blockchain for transaction information," "blockchain network for transaction events," or "blockchain network for transaction events and disputes"), a settlement or exchange of funds or currency ("blockchain network for settlement"), or for various other functions may result in efficiencies, reduced chargebacks, efficient allocation of resources, and reduction in costs for both issuers and merchants. Furthermore, the blockchain networks may be interlinked, for example, via a partially or fully shared ledger, via individual ledgers for each blockchain networks that may share necessary information among each other, or a means of communicating necessary information for a transaction in a secure way (e.g., "inter ledger communication" protocol). Thus, in a hyperledger, a blockchain network may be linked to another blockchain network via an addressing system. However, the ledger of one blockchain network may withhold some information from the ledger of another blockchain network, e.g., for privacy or confidentiality, even if both blockchain networks may be involved in the same transaction.

One or more blockchain networks of an exemplary hyperledger may be the blockchain network(s) for transaction events and disputes. The blockchain network for transaction events and disputes and disputes may record various events of a transaction. The participants of the transaction may dispute the data for one or more transaction attributes, and the blockchain network for transaction events and disputes and disputes may be used for retrieving information to resolve the dispute (e.g., using a Smart contract API from a blockchain applications server). However, if the blockchain network for transaction events and disputes and disputes successfully resolves a dispute (e.g., if the parties to the dispute agree with or do not contest with the results of the blockchain dispute resolution), the blockchain network for settlement may duly process and record the appropriate exchange of funds between the parties of the transaction. It is contemplated that in some embodiments, a hyperledger may delegate the above-described functions in other arrangements of blockchain networks. For example, a blockchain network for events may passively record various events of a transaction and alert these events, e.g., to a blockchain state observer. In such an example a blockchain network for disputes may be assigned the task of resolving disputes.

In some embodiments, if a blockchain dispute resolution process (involving the blockchain for transaction events and disputes) is unsuccessful in resolving a dispute (e.g., if one or more of the parties to the dispute indicate that they do not agree with the result of the blockchain dispute resolution) the payment network may take over in handling the dispute (e.g., via the traditional network dispute resolution process, referred to as "payment network dispute resolution" herein). Nevertheless, the blockchain dispute resolution process may be able to help address a large proportion of the disputes and/or chargebacks of payment transactions without the network intermediary, for example, if there exists a degree of trust between the participants in the dispute (e.g., consumers, issuers, merchants, acquirers, etc.).

It is contemplated that the blockchain dispute settlement process may reduce the need for payment network dispute settlement, and thereby reduce the need for maintaining two dispute settlement systems for a potential dispute. In some embodiments, it is also contemplated that any dispute settlement may be confined to the blockchain dispute settlement process, e.g., to reduce the cost of having to maintain more than one dispute settlement systems.

In some embodiments, the participants of the dispute may be represented as nodes or peers of a blockchain network and/or may be able to access and/or contribute to the blockchain, e.g., via representative nodes or peers. Unlike network dispute resolution process, which may rely on a centralized authority (e.g., a payment network), a blockchain dispute resolution process, e.g., as described by various embodiments of the present disclosure, may facilitate a transparent, rules-based, communication process to possibly reduce costs for both merchants and acquirer, using one or more blockchains (e.g., the blockchain network for transaction events and disputes and the blockchain network for settlement).

The types of blockchain systems used for dispute management for payment transactions may include, for example, public blockchains, private blockchains, a hybrid form of a public and private blockchain (e.g., a consortium blockchain or hyperledger blockchain), a ripple blockchain as described above (e.g., for the exchange of funds for the processing of a transaction).

In a consortium blockchain, the consortium may include and be accessible to the participants of the blockchain (e.g., consumers, issuers, merchants, and/or acquirers of a payment transaction). A consortium blockchain may proffer the benefits of setting control of the rules for dispute settlement within the bounds as agreed upon by the participants. Thus, the rights to read and/or access the blockchain may be restricted to different participants, based on individual classes or identities of the participants. In some embodiments, a blockchain applications server would periodically or continually read and/or access the blockchain to provide posted information to interest parties (e.g., consumer, merchant, issuer, acquirer, etc.). Allowing the blockchain applications server to act as an intermediary between the blockchain and the participants may ensure, for example, the protection of private information. The blockchain applications server may also add to the blockchain based on the input of the interested parties.

In some embodiments, the participants of a blockchain, prior to joining the blockchain, may be vetted, and hence may not be anonymous participants. Vetting may reduce the risk of any form of malicious attacks on the blockchain. In other embodiments, the new entrants to a blockchain may be restricted to those known by other known participants of the blockchain. These blockchains (e.g., a consortium blockchain) may significantly reduce the risks of attacks that are prevalent, for example, in public blockchains (e.g., 51% attack). The risks may be significantly reduced due to restrictions placed on the entry of new members. The transactions may resemble the "colored pin" approach of transferring ownership to different participants in the blockchain. It may also be efficient to use certain blockchains due to the limited number of nodes that may need to be updated and the limited role of verifying the blocks before those are appended to the blockchain. The members or participants of the blockchain may be represented as nodes of the blockchain. In some embodiments, for example, where the nodes may be "trusted" and/or be well connected, a blockchain may enable the nodes to easily spot and/or fix any failures or inconsistencies of the blockchain.

In some embodiments described in the present disclosure, a hyperledger may be used, and which may comprise multiple blockchain networks. A hyperledger may provide flexibility to develop on a blockchain infrastructure. For example, a hyperledger may be specifically built to expand to other non-traditional use cases of the blockchain. Since verification may be needed by a comparatively larger number of nodes in the public blockchain as compared to a consortium or private blockchain, a public blockchain may require a higher level of computational power than a consortium or private blockchain.

One benefit provided by the use of a hyperledger may be demonstrated by the following example. A hypothetical offshore manufacturer X who is in the business of selling a product to various markets, may decide to expand to a certain market Y, and in the process of securing the market, offer to sell the product at a special low price LP, even as X continues to sell the product to other markets at a regular price, RP. Should a transaction ensue between X and Y, some transaction details may inevitably need to be shared among manufacturer X, assemblers, suppliers, shippers, banks, market Y, and others. However, if manufacturer X wants to maintain the regular price RP for the sale of its products to other markets, there would be a need for a system to efficiently, and cost-effectively carry forth the transaction among the various parties described above, while restricting the flow of confidential transactional information, e.g., the special low price, LP. For example, some of the parties may need to know that the product of manufacturer X has been verified and shipped into a shipping container. Others need to know about other details regarding the transaction, but may not need to know about the special low price, LP. A hyperledger may facilitate this system, while also offering the traditional benefits of a blockchain infrastructure described above. For example, the ledgers of the blockchain networks serving a function of the above-described transaction, but that maintain, among its peers, nodes, or participants, other markets who may not need to know the special low price LP, would not display the special low price, LP on its ledgers, as these blockchain networks may be restricted from receiving this information.

Another distinguishing feature for hyperledger may be that the peers, nodes, and/or participants of a blockchain network of the hyperledger's multiple blockchain networks may have different runtimes, and/or have distinct roles. For example, some peers may have a different runtime than other peers (e.g., consenters). In some embodiments, the roles may include, for example, an endorser, a committer, and a consenter.

Furthermore, a hyperledger's architecture may provide modularity, enabling network designers to plug in their preferred implementations for components. Components of a hyperledger-based architecture that can be easily plugged in into one or more blockchain networks include consensus methods described above, encryption (e.g., where some countries have their own encryption standards), smart contracts, inter-ledger communication protocols. Some plug-ins (e.g., Hardware Security Module (HSM)) may provide vital support for safeguarding and managing digital keys for strong authentication, and may support cases for identity management that need more protection.

Businesses, due to the competitiveness, protection laws, and regulations on confidentiality of personal data, may dictate the need for privacy of certain data elements, which can be achieved through data partitioning via the multiple blockchain networks of the hyperledger. The hyperledger may provide channels that may allow for data to go to only the parties that need to know.

In some embodiments, the hyperledger may be built on an architecture that separates transaction processing into multiple phases, including, but not limited to distributed logic processing and agreement ("chaincode"), transaction ordering, and transaction validation and commitment. The separation confers several advantages: Fewer levels of trust and verification are required across node types, and network scalability and performance are optimized.

In one exemplary embodiment, data may be stored within a blockchain network of a hyperledger in the following process, in accordance with at least one non-limiting embodiment. First, a transaction data to be added (e.g., a "transaction proposal") may be submitted by one or more applications of a blockchain application server to an endorsing peer ("endorser") of a blockchain network. An endorsement policy may outline how many and/or what combination of endorsers may be required to sign the transaction proposal. The endorser may execute a chaincode to simulate the transaction proposal in the network peer, creating a read/write set. Subsequently, the endorsing peers of the blockchain network may then send back the signed proposal responses (e.g., endorsements) to the one or more applications of the blockchain application server. Further, an application, e.g., of a blockchain application server, may submit the transactions and signatures to an ordering service. The ordering service may create a batch, or "block," of transactions and may deliver them to committing peers. Upon receiving a batch of transactions, a committing peer may, for each transaction, validate that the endorsement policy was met and check in the read/write sets to detect conflicting transactions. If both checks pass, the block may be committed to the ledger of the blockchain network. Updates for each transaction may be reflected in a state database and/or may be observed and presented by a blockchain state observer.

Among the various blockchain networks of a hyperledger, it may also be useful to use certain blockchains (e.g., Ripple) for specific functions like a settlement or exchange of funds, because such blockchains may be designed to satisfy risk, privacy, and compliance requirements and/or may be specifically designed for the financial services industry with a number of banks and/or financial institutions already in the network.

In some embodiments, as is evident in at least some embodiments of the hyperledger blockchain networks described throughout this disclosure, the blockchain dispute resolution process may involve a Smart contracts application. In various embodiments, "Smart contracts" may refer to a computerized transaction protocol that facilitates, verifies, and/or enforces the negotiation or performance of a contract (e.g., as the one governing a payment transaction between the issuer and the merchant or merchant's acquirer). A Smart contract may satisfy common contractual conditions (e.g., payment terms, liens, confidentiality, enforcement, etc.), reduce malicious and/or accidental exceptions, and/or reduce the need for trusted intermediaries. Different types of algorithms may be employed to offer finality (e.g., of a contract) in a shorter timeframe. Various rules for initiating or managing the dispute settlement between parties can be "codified" into the smart contract between the participants. In some embodiments, once the rules have been "codified" into the blockchain, the rules of the Smart contracts may be rendered or configured to be final and/or immutable during its execution of the Smart contract. Furthermore, the blockchain may serve as an audit trail for the resolution of disputes among the participants, should questions arise as to the dispute settlement process.

Figure 4A:
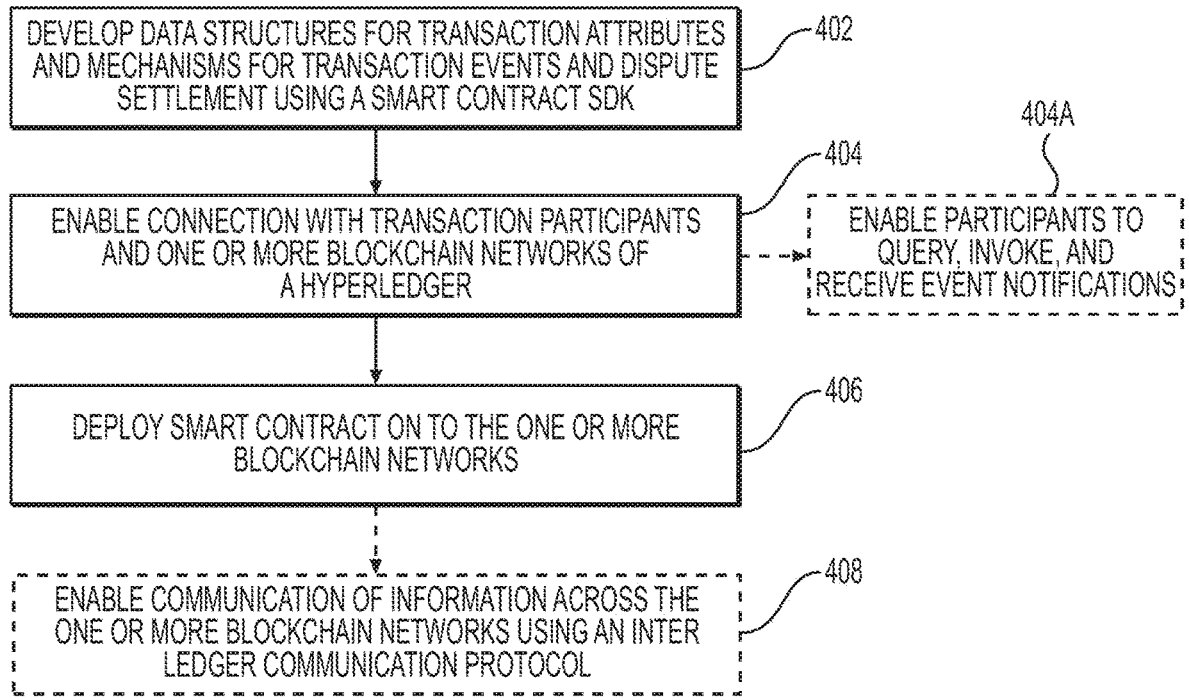
FIGS. 4A-4B depict block diagrams of a general method for implementing smart contracts for use in hyperledger-based payment transactions, alerts, and dispute settlement, in accordance with non-limiting embodiments.
Figure 4B:
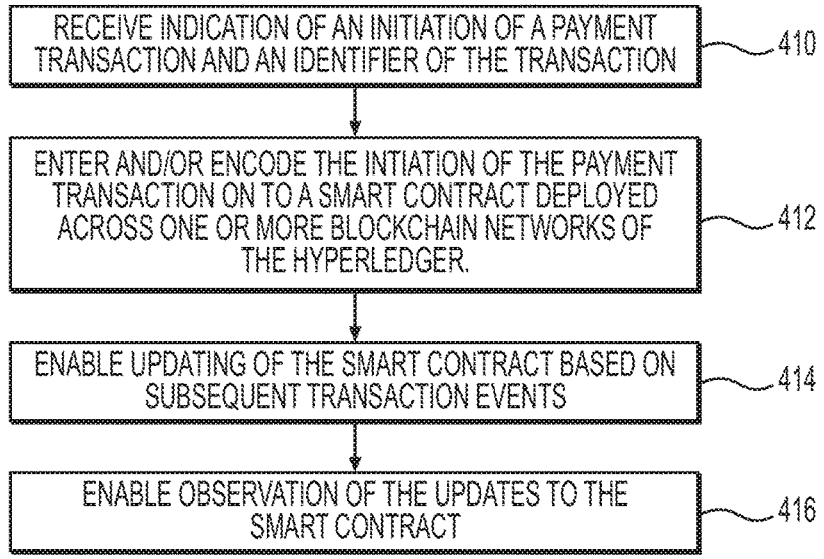

For example, the blockchain dispute resolution process may be governed and/or at least initialized using Smart contracts. Participants of the dispute resolution process (e.g., consumers, issuers, merchants, acquirers, etc.,) may establish the underlying attributes of the contract governing the payment transaction, or the underlying rules of the dispute resolution process. Smart contracts may then proceed to execute the payment transaction based on the underlying attribute values or facilitate the dispute resolution process using the underlying rules. FIGS. 4A-4B may describe at least some embodiments for the methods of implementing smart contracts for some embodiments of the present disclosure.

It is also contemplated that among the multiple blockchain networks, e.g., of a hyperledger, one blockchain network may be able to access information stored within a smart contract embedded in another blockchain network, e.g., via an addressing system. The addressing system may include, for example, an inter-ledger communication protocol, which may be embedded within one or more blockchain networks as an inter-ledger communication protocol plug-in. Additionally or alternatively, information for another blockchain network or ledger may accessed, for example, via a transaction identifier, or an identifier of a transaction participant or payment source.

In some embodiments, cryptographic assurances may be available to the participants. Any documents may be captured and securely stored by the blockchain, for example, in an off-the-blockchain storage (e.g. NoSQL database), for retrieval by the other party. Identifiers to these documents may be stored in the blockchain. These documents may include, for example, receipts of purchases, identification information of the consumer, merchant, issuer, or acquirer, available funds or resources, geographical information, or temporal information.

In further embodiments, user interface systems and methods are disclosed for analyzing the various data stored in the blockchain. The various data may include information regarding a specific attribute(s) of a transaction (e.g., other transactions that share the same attribute(s)). In some embodiments, one or more of the specific attribute(s) that is being analyzed may be in dispute in the original transaction. The attributes may include, for example, a party to the transaction or transaction dispute, and such embodiments may also be able to provide analytical data on that party (e.g., transaction history of that party, incidents of fraud that resulted from that party, etc.)

One or more examples of these non-limiting embodiments are illustrated in the selected examples disclosed and described in detail with reference made to FIGS. 1-3 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 depicts an illustration of the environment of hyperledger-based payment transactions, alerts, and dispute settlement, using smart contracts, in accordance with non-limiting embodiments. At a high level, the environment comprises: a consumer 102 equipped with a payment vehicle 104 from an issuing bank or institution, i.e., "issuer" 110; a merchant 106 with an acquiring bank or institution, i.e., "acquirer" 108; a server, computing system, or application program interfaces that manage or is involved with hyperledger-based payment transactions, alerts, and dispute settlement, of the various blockchain networks ("blockchain applications server" 112); and a plurality of blockchain networks serving various functions or roles of a transaction process, e.g., a blockchain network for transaction events and disputes 116, a blockchain that is involved with the actual transfer of funds, currency or cryptocurrency ("blockchain network for settlement" 114, "blockchain networks for other functions" 118). To emphasize the existence of a network of nodes or member participants of a blockchain, "blockchain network" may be used in lieu of blockchain throughout this disclosure. It is contemplated that the blockchain dispute settlement process described herein may eliminate the need for a payment network server that was traditionally used for settling disputes. In various embodiments of the present disclosure, the acquirer 108 and the issuer 110 may also refer to the computing system or server of the acquirer 108 or issuer 110, respectively.

Various embodiments of the present disclosure may involve consumer 102 conducting a payment transaction with merchant 106 using a payment vehicle 104, e.g., a credit card, debit card, mobile device, a bitcoin or Litecoin account ID or card, or the like. It will be appreciated by those of skill in the art that consumer 102 may present payment vehicle 104 at a POS terminal of merchant 106 to initiate a payment transaction. However, in some embodiments, there may be an online portal of a merchant for the consumer to initiate a payment transaction in lieu of a physical POS terminal. In some embodiments, for example, where a manufacturer or producer is the merchant, and a consumer is a market, the initiation of a payment transaction may not involve a POS terminal. It is contemplated that in such embodiments, the initiation of a payment transaction may be agreed to contractually, and the indication of the initiation may be delivered electronically to various systems described herein. Upon initiation of the payment transaction by a consumer, the merchant and/or the POS terminal of the merchant may transmit transaction information to the acquirer 108 of the merchant. The transaction information may include, for example, information identifying the issuer 110 of the payment vehicle 104 of the consumer 102, or information identifying a cryptocurrency (e.g., bitcoin, Litecoin, etc.,) account of the consumer 102 or the issuer 110. The acquirer 108 may transmit the transaction information to the issuer 110, and request payment of funds, in accordance with the terms of the transaction.

The issuer 110 may dispute one of the terms of the transaction, e.g., the amount of funds required, the type of purchase made, the payment vehicle used, etc. If there is a disagreement between the acquirer 108 (or merchant 106) and the issuer 110 (or consumer 102) as to the terms of the transaction, one or more of the disputants (e.g., acquirer, issuer, merchant, or consumer) may relay information related to the dispute ("dispute information") to the blockchain applications server 112. The dispute information may be encrypted and entered into a blockchain where the disputants may be members (e.g., nodes), and therefore may be able to read and/or access each block of the blockchain. The blockchain applications server 112 may attempt to resolve the dispute using at least some of the methods described in the present disclosure. The blockchain applications server 112 may present the dispute resolution to the disputants (e.g., acquirer, merchant, issuer, consumer, etc.). The dispute resolution may itself be another entry into the distributed ledger of one or more blockchain networks (e.g., the blockchain network for transaction events and disputes), which the members of the blockchain may be able to read and/or access. Furthermore, the blockchain applications server 112 may facilitate communication between the blockchain network for transaction events and disputes and blockchain network for settlement 114 (e.g., Ripple) for immediate settlement of payment. In some embodiments, if one or more of the disputants do not agree with the dispute resolution presented by the blockchain applications server, the dispute information may be relayed to a payment network server to resolve the dispute through conventional dispute settlement processes. In other embodiments, it is contemplated that the blockchain dispute settlement process may eliminate the need for payment network dispute settlement, and thereby prevent the need for maintaining two dispute settlement systems for a potential dispute. In further embodiments, it is also contemplated that any dispute settlement may be confined to the blockchain dispute settlement process, e.g., to reduce the cost of having to maintain more than one dispute settlement systems.

Figure 2:
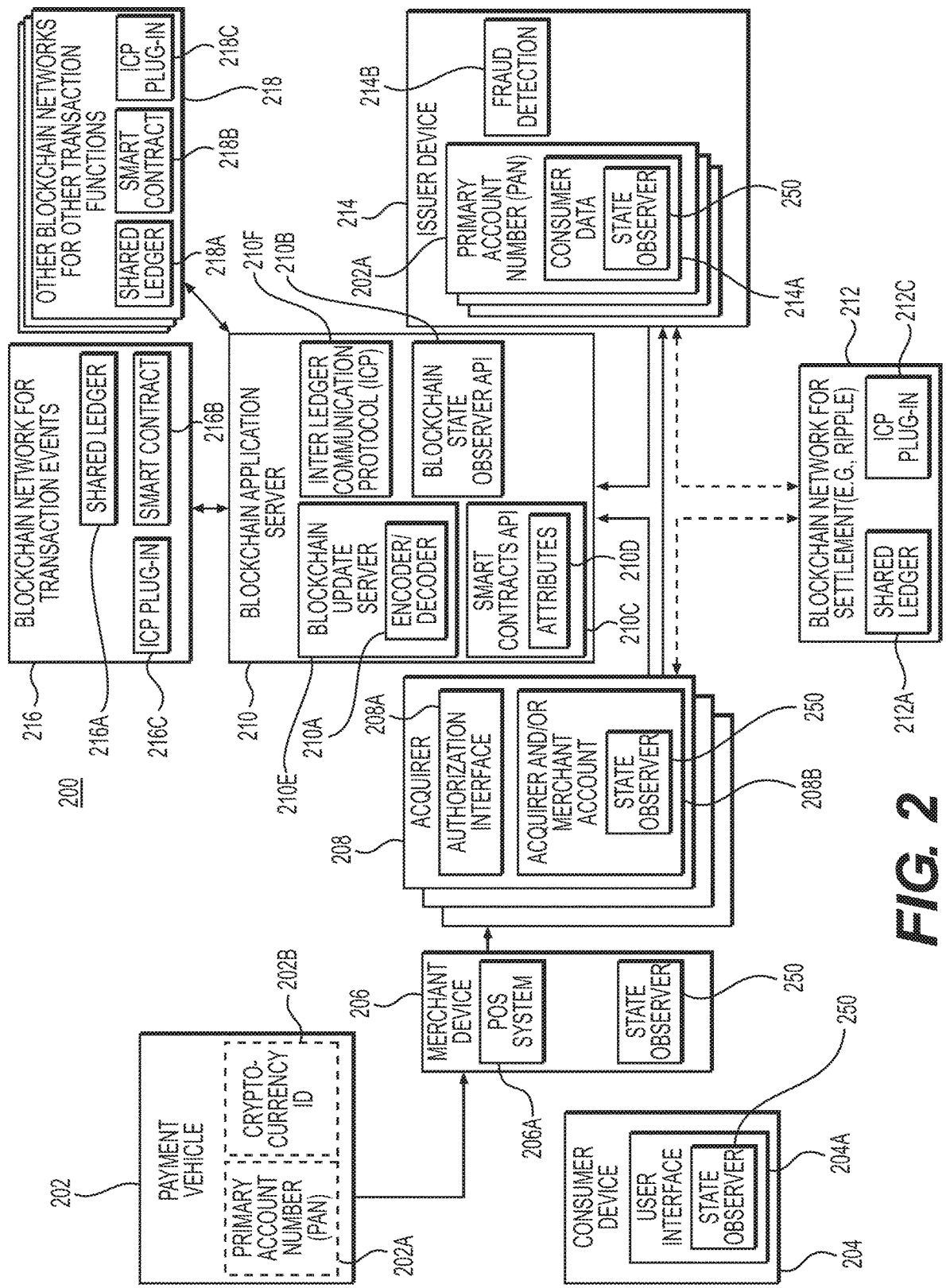
FIG. 2 depicts a block diagram of an example network of hyperledger-based payment transactions, alerts, and dispute settlement, using smart contracts, in accordance with non-limiting embodiments.

FIG. 2 depicts a block diagram of an example network 200 of the hyperledger-based payment transactions, alerts, and dispute settlement, using smart contracts, in accordance with non-limiting embodiments. Specifically, the network may include the payment vehicle 202 of a consumer, a consumer device 204 of a consumer, the merchant 206, the acquiring institution or computing system ("acquirer" 208), a server or collection of application program interfaces (APIs) ("blockchain applications server") 210 that may manage payment transactions, alerts, and disputes, by updating one or more blockchain networks of a hyperledger, or serve as a platform for various applications running on the blockchain networks, an issuing institution or computing system ("issuer device" 214), and one or more blockchain networks performing various functions or playing various roles related to a payment transaction. The one or more blockchain networks may include, for example, a blockchain ("blockchain network for transaction events and disputes" 216) for storing transaction information that can be retrieved by blockchain applications server 210 to trigger alerts or disputes (e.g., a consortium blockchain) and a blockchain ("blockchain network for settlement" 212) that is used in the processing of the transaction involving the transfer of funds and/or record keeping of the exchange of a currency or crypto currency. In one embodiment, the Ripple blockchain may be used as the blockchain network for settlement. It is contemplated, however, that in some embodiments, the blockchain dispute settlement process involving the multiple blockchains may reduce the need for payment network servers that are conventionally used in resolving disputes.

The payment vehicle 202 may be linked with a financial account of resources or funds defined by a primary account number ("PAN") 202A. In one embodiment, the PAN may identify one or more payment source accounts of the consumer, issued or established by a given issuer 214. Alternatively or additionally, the payment vehicle 202 may be linked with a financial account of cryptocurrency resources or funds (e.g., bitcoin, Litecoin, etc.,) defined by cryptocurrency identification (ID) 202B. In one embodiment, the PAN or cryptocurrency ID may identify one or more payment source accounts of the consumer, issued or established by a given issuer 214. Unless otherwise specified herein, a payment vehicle may include a physical card including a plastic or metallic card having a magnetic stripe, bar code, or other device or indicia indicative of an account number or other account information, and/or a virtual card, such as a display or screen shot for a mobile phone or for another portable device (e.g., a flash drive, smart chip, a laptop or portable computer), or for a computer device (e.g., a desktop computer) in combination with data indicative of an account number or other account indicative information. It is also contemplated that the payment vehicle 202 may have multiple embodiments or forms. For example, payment vehicle 202 can be a physical card (e.g., in the form of magnetic striped plastic card), a virtual card (e.g., in the form of a display on a smart phone), or both. The virtual card may be communicated by displaying a display or screen shot, and/or by transmitting a signal, such as by using NFC (Near Field Communication) technology or other secure transport technologies to complete the transaction with the selected merchants. Optionally, the virtual card may have a display element (e.g., a bar code or string of numbers) which identifies the account number (e.g., PAN) associated with the card. Alternatively, the virtual card may have display elements relating to the merchants that accept the card.

A consumer, sometimes referred to as the end user, a cardholder, or a card member, may provide identifying information, e.g., via the PAN 202A or cryptocurrency ID 202B of the user, to the POS system 206A of the merchant 206 to initiate a transaction with merchant 206 using the consumer's payment vehicle 202 (e.g., an enrolled credit card). In some cases, the consumer may use a computing device or mobile device ("consumer device" 204) to initiate the transaction, such as for a card-not-present transaction at an online merchant. Thus, payment vehicle 202 may enable the consumer to initiate a transaction with merchant 206 using the payment source associated with the issuer 214 that issued the payment vehicle 202 to the consumer. A consumer may also use the consumer device 204 to oversee, manage, or access details regarding a payment transaction via user interface 204A. Transaction details may be accessible to the consumer via a state observer 250, which the consumer may access via the user interface 204A of consumer device 204. The state observer may present transaction information by observing the ledgers of the one or more of the blockchain networks comprising the hyperledger, depending on the extent to which each blockchain network is designed or configured to share with the specific end user (e.g., consumer, merchant, acquirer, issue, etc.) Thus, during a dispute settlement process mediated by the blockchain applications server 210, a consumer may view the results of a dispute settlement process presented by the state observer 250, using the user interface 204A of consumer device 204. In some embodiments, the state observers may periodically or continually retrieve the latest data of stored in one or more of the blockchain networks and/or the shared ledgers of the one or more of the blockchain networks (e.g., shared ledger 216A, shared ledger 212A, and shared ledger 218A), and then make it accessible to interested parties (e.g., consumer via user interface 204A, merchant 206, acquirer 208, issuer 214, etc.). It is contemplated that in some embodiments, transaction information (e.g., merchant, consumer, transaction amount, good or service, etc.) stored in the blockchain network for transaction events and disputes 216 would be made accessible or observable to interested parties (e.g., consumer, merchant, issuer, acquirer, etc.,), whereas account balance information of various parties that are stored, for example, in the blockchain network for settlement 212 (e.g., Ripple) may not be as easily accessible or observable due to privacy concerns. The state observer 250 or an application of the blockchain applications server 210 (e.g., encoder/decoder 210A) may need to decode entries stored in the one or more blockchain networks. In some embodiments, the state observer 250 may have an encoder/decoder or a similar application to decode entries to be presented to the end user. In some embodiments, the state observer may be an application run on the user devices of the transaction participants (e.g., consumer, merchant, issuer, acquirer, etc.). In such embodiments, the state observer may be managed or controlled by a server or API. This server or state observer API may be a part of blockchain applications server 210. A consumer may also use the consumer device 204 to initiate a dispute and/or have a computing system of issuer 214 initiate a dispute based on information presented via user interface 204A.

In various embodiments described herein, a merchant 206 may refer generally to any type of retailer, service provider, or any other type of business that is in networked communication with the computing system of an acquiring institution or bank ("acquirer" 208) and uses the payment processing services of acquirer 208. Payment processing services may include receiving and responding to authorization requests as well as facilitating the settlement of funds associated with card-based transactions occurring at merchant 206. In some embodiments, as described herein, the acquirer 208 may use the one or more blockchain networks of the hyperledger to facilitate the settlement of funds (e.g., using blockchain network for settlement 212) associated with the card-based transactions occurring at merchant 206. A merchant 206 may have one or more POS systems 206A. In various embodiments described herein, a POS system 206A may refer broadly to include POS systems at brick and mortar locations and "virtual" POS systems that can be associated with online retailers or "in-app" purchases. In some cases, a POS system 206A may include a physical terminal, or other network computing system used to facilitate a payment transaction at a location of merchant 206. Each POS system 206A may be generally unmodified or "stock" and simply facilitate the standard transmission of transaction-related information to the acquirer computing system 208, as is known in the art. The transaction-related information may comprise a transaction authorization request ("authorization request"), including but not limited to, a payment amount, a date, a time, a primary account number, as well as other types of identifying indicia (e.g., merchant identification). The identifying indicia may vary based on POS system 206A, the type of merchant, and the type of transaction, but example types of identifying indicia may include any of the following: an alternative identifier to the primary account number of the user; a user's name or other user identifier; a merchant identification (MID) identifier; a merchant category code (MCC) identifier; a media access control (MAC) identifier; an internet protocol (IP) identifier; a geographic identifier; and/or a payment type identifier. In some embodiments, as described herein, a merchant 206 may also be able to oversee, manage, and/or access details regarding a payment transaction originating at the merchant 206, via a shared ledger 250. In some embodiments, during a dispute settlement process mediated by the multiple blockchain networks of the hyperledger, a merchant may view the results of a dispute settlement process posted in the shared ledger(s) of one or more blockchain networks, for example, where a merchant is a participant, node, or peer of the blockchain network of the shared ledger. In other embodiments, the blockchain state server 250 may periodically or continually retrieve the latest data of stored in blockchain network for transaction events and disputes 216 and/or its shared ledger, and then make the latest data accessible to interested parties (e.g., consumer via user interface 204A, merchant 206, acquirer 208, issuer 214, etc.). In such embodiments, the state observer 250 and/or blockchain applications server 210 may need to decode entries stored in the blockchain 216 or its ledger, via an encoder/decoder (e.g., encoder/decoder 210A). A merchant 206 may also initiate a dispute and/or have the acquirer computing system 208 initiate a dispute, and have the blockchain applications server 210 facilitate the dispute, via one or more applications running on the one or more blockchain networks (e.g., smart contracts 216B, deployed in the blockchain network for transaction events and disputes 216).

Referring now to acquirer computing system 208, authorization interface 208A may receive a transaction authorization request from POS system 206A of merchant 206. The authorization request may comprise various data, including, for example, a MID, a MCC, the cardholder's primary account number 202A or cryptocurrency ID 202B, and a transaction amount, among other things. In some embodiments, acquirer computing system 208 may also receive other consumer-identification related data, e.g., an email address, an IP address, etc. In yet another embodiment, the transaction authorization request detail may contain identifying information about the merchant. Once the authorization request is received, acquirer computing system 208 may transmit the transaction authorization request, including the amount of funds required for the transaction ("transaction amount") and the primary account number 202A of the user, received from POS system 206A, to blockchain network for settlement 212 for further processing of the payment transaction. In some embodiments, a component of acquirer computing system 208 (e.g., authorization interface 208A) may also transmit data identifying the acquirer (e.g., the identifying information of the acquirer bank, for example, the acquirer's cryptocurrency ID) to blockchain network for settlement 212. In other embodiments, a merchant 206 may directly transmit the payment authorization request to blockchain network for settlement 212 for further processing of the payment transaction.

It is also contemplated that in some embodiments, the settlement of funds and further processing of the transaction by blockchain network for settlement 212 may be facilitated by one or more applications of blockchain applications server 210 (e.g., smart contracts API 210C and its plug ins (e.g., smart contracts 216B and 218C), inter ledger communication protocol API 210F and its plug ins (e.g., ICP Plug-Ins 216C and 218C), etc.). In such embodiments, once the authorization request is received, acquirer computing system 208 may transmit the transaction authorization request, including the amount of funds required for the transaction ("transaction amount") and the primary account number 202A or cryptocurrency ID 202B of the user, received from POS system 206A, to blockchain applications server 210. Alternatively or additionally, the request and the payment information may be directly transmitted to the blockchain network responsible for the settlement and/or transfer of funds (e.g., blockchain network for settlement 212).

Still referring to FIG. 2, once the transaction authorization request is delivered to blockchain applications server 210, the blockchain applications server may store transaction information of the transaction authorization request into a blockchain (e.g., "blockchain network for transaction events and disputes" 250) and/or its shared ledger, using one or more applications or services. For example, the applications and services may include, but are not limited to, blockchain update server 210E to enter the information, encoder decoder 210A to encrypt the information, smart contracts API 210D to store the information, inter ledger communication protocol 210F to distribute the information or enable accessibility of the information among other blockchain networks, etc. Transaction information of the transaction authorization request, by way of being stored in the blockchain and/or shared ledger may be accessible to interested parties (e.g., consumer, issuer, merchant, acquirer, etc.) or may be made accessible by the blockchain applications server. By viewing various transaction information on user interfaces or devices, an interested party may be able to contest an entered data for one or more transaction attributes. In some embodiments, the claims of the disputants may be entered into one or more blockchain networks using one or more applications or services provided by blockchain applications server 210 (e.g., smart contracts API 210C) as to what each disputant believes is the correct data entry for a transaction attribute. The blockchain applications server may facilitate a dispute resolution process using, for example, Smart contracts 210C.

If no parties dispute the published and/or accessible transaction information, the transaction authorization request may be processed at blockchain network for settlement 212A. In some embodiments, the blockchain applications server may relay the transaction authorization request and/or facilitate communication between blockchain network for transaction events and disputes 216 and blockchain network for settlement 212 using electronic communication channels for communication between blockchain networks (e.g., "inter ledger communication" protocol 210F). An example of blockchain network for settlement 212A includes but is not limited to real-time gross settlement systems (RTGS), like Ripple, which facilitate currency or cryptocurrency exchange and remittance via a network. Such blockchain networks may enable secure instant and nearly free global financial transactions of any size with no chargebacks, and may support tokens representing fiat currency, cryptocurrency, commodities etc. It is also contemplated that such blockchain networks, like Ripple, would be designed to comply with risk, privacy and compliance requirements and specifically designed for financial services industry with a number of banks/financial institutions already in the network. Thus, issuer 214 and acquirer 208 may be a part of the network comprising the blockchain network for settlement 212. Thus the blockchain network for settlement 212 may record the funds extracted from one or more of the consumer, merchant, acquirer, or the issuer.

Additionally or alternatively, the transaction authorization request may be processed according to methods known to those having ordinary skill in the art. For example, payment network server, may store the transaction related information and route the payment authorization request to the issuer to request funds to complete the transaction. In some embodiments, the payment network server may also extract funds from one or more of the merchant, acquirer, or the issuer, for the payment network that serves as an intermediary for the transaction. Traditionally, when disputes arise concerning information of a payment transaction, the payment network used for the payment transaction provides a means for the dispute resolution ("payment network dispute resolution"). Often during the payment network dispute resolution, a server, application, or department of one of the various entities described in FIG. 2 (e.g., fraud detection 214B of issuer 214) may investigate the payment transaction for possible fraud. In some embodiments, the participants of the dispute may resort to the payment network server for resolving disputes if the participants cannot agree to the results of a dispute resolution process mediated by blockchain applications server 210 ("blockchain dispute resolution") using one or more of the blockchains. In other embodiments, it is contemplated that the blockchain dispute settlement process may eliminate the need for payment network dispute settlement, and thereby prevent the need for maintaining two dispute settlement systems for a potential dispute. In further embodiments, it is also contemplated that any dispute settlement may be confined to the blockchain dispute settlement process, e.g., to reduce the cost of having to maintain more than one dispute settlement systems.

In various embodiments described herein, an issuer 214 may refer to an institution or organization that issues a payment vehicle 202 to the consumer or to the computing system of the institution or organization. The issuer 214 may enable the consumer to use funds from a payment source and/or cryptocurrency held by or managed by the issuer. For example, the issuer 214 may be the bank of the consumer, which stores the consumer's checking and savings account. In some embodiments, an issuer may utilize an issuer computing system to receive and transmit various transaction-related information (e.g., receive transaction authorization request from the acquirer). After receiving a transaction authorization request, an issuer may use the primary account number (PAN) 202A associated with the transaction authorization request to locate data regarding a consumer ("consumer data" 214A). The consumer data 214A may include, for example, the account balance of the consumer, and/or a designated account to be used for the transaction. In one embodiment, at least some of the consumer data as it pertains to a payment transaction may be stored in a shared ledger 250 of one or more blockchains, where the participants of the blockchain include the parties involved in the payment transaction (e.g., consumer, merchant, issuer, acquirer, etc.). In some embodiments, the transaction authorization request made by the acquirer may itself be a block in one or more blockchain networks, accessible to the issuer (and other participants of the blockchain) on the shared ledger of the blockchain network, or may be presented to the issuer from the shared ledger via state observer 250. In some embodiments, the one or more applications of the blockchain applications server 210 may assist in the storage of fraud information related to current and/or or prior transactions related to the consumer, merchant, issuer, and/or acquirer. In such embodiments, before a transaction authorization request is initiated, a participant of the blockchain (e.g., acquirer) may check (e.g., via a user interface) for any records of fraud related to the PAN, cryptocurrency ID, or identifying information related to a party of the transaction, and then may deny the transaction (e.g., based on possibilities of fraud). The issuer, 214, using, fraud detection 214B, may be useful in providing fraudulent data to the blockchain applications server 210 so that parties to a transaction may collaboratively resolve a dispute, should a dispute arise. In some embodiments, one or more applications or functions of the blockchain applications server 210 may store the fraud information into one or more blockchain networks (e.g., blockchain network for transaction events and disputes 216), and may retrieve the information, e.g., upon request by an interested party.

Once the funds are withdrawn, a new entry may be published in the blockchain network for transaction events and disputes 216 by the blockchain applications server 210 (e.g., via encoder/decoder 210A) to signify, for example, that a fund transfer was completed. Additionally or alternatively, the blockchain applications server 210 (e.g., via encoder/decoder 210A) may publish in the ledger of the blockchain network for settlement 216, and/or cause the ledger of the blockchain network for settlement 216 to reflect, new account balances for one or more parties to the transaction as a result of the exchange of the currency or cryptocurrency involved. In some embodiments, the blockchain state observer 250 may periodically or continually observe one or more of the blockchain networks and inform the participants of the blockchain of the new entry. In one embodiment, the blockchain state observer 250 may direct its observation at the blockchain network for transaction events and disputes 216, which may function as a record keeper for the various "events" of a transaction process. The blockchain network for settlement 212 (e.g., Ripple) may function as a master record keeper of account balances and fund transfers for its various member participants. Likewise, other blockchain networks may be involved for other business functions or roles in the transaction (e.g., other blockchain networks for other transaction functions 218). In other embodiments, the participants of the blockchain (e.g., merchant, acquirer, consumer, issuer, etc.) may be informed of new entries into the one or more blockchains directly, e.g., via a shared ledger of a blockchain network in which they are a participant, node, or peer in, or they may be informed via state observer 250 presenting the transaction events on a user interface. In further embodiments, while the shared ledger of a blockchain network may be accessible to participants of the blockchain network, the blockchain applications server 210 or state observer 250 may assist in decoding information, e.g., via encoder/decoder 210E, from the shared ledger and/or in otherwise making the information of the shared ledger more accessible or understandable to the participants of the blockchain. For example, as will be described in FIGS. 5A-5B, 6, and 7, the blockchain state observer 250 may present the information using data analytics and Smartbots.

After any block providing information regarding one or more attributes of a payment transaction has been published in a blockchain (e.g., blockchain network for transaction events and disputes 216), one or more participants of the blockchain may dispute the accuracy of the information presented. Thus, a dispute may be initiated by one or more participants of the blockchain at any point in the payment transaction process.

One or more applications or programs hosted by the blockchain applications server 210 may oversee the dispute resolution process, e.g., via smart contracts, when one or more participants of the blockchain disputes any data about an attribute of the payment transaction ("transaction information") presented by state observer 250. The attributes may include, but are not limited to: the identity of the merchant, consumer, acquirer, or issuer of the payment transaction; the transaction amount; an itemization and description of the goods and/or services transacted for; any geographical and/or temporal information of the payment transaction; any taxes, any tips, any discounts; any fees directed towards acquirers, issuers, payment networks; currency exchange rates; etc. In some embodiments, any data (e.g., value, name, etc.) for an attribute of the transaction information posted to a blockchain network or its ledger, or to a smart contract deployed in the blockchain network, may be encrypted using encoder/decoder 210A, for example, to provide security and/or protect sensitive information. Data stored for these attributes may be quantitative (e.g., an amount) and/or qualitative (e.g., name of merchant). In some embodiments, metadata may also be stored. A blockchain update interface 2106 may be one or more of an application, application program interface, software, hardware, server, or protocol that allows the addition of data (e.g., a new attribute or a detail regarding an attribute for the payment transaction or dispute, a proposed modification of the attribute by a disputing party, etc.) to a blockchain, smart contract, and/or shared ledger 250. In some embodiments, the blockchain update interface 2106 may respond to input to add data to a blockchain and/or shared ledger by having the encoder/decoder 210A to encrypt the data before it is added into the blockchain. In other embodiments, the encoder/decoder 210A may also serve the functions of and/or be used in lieu of a blockchain update interface 2106. Thus, blockchain update interface 2106 and/or an encoder/decoder 210A may respond to requests to add attributes of a payment transaction, dispute one or more of the previously posted data for a transaction attribute (e.g., by entering into a blockchain an indication of the dispute), and/or add a proposed modification to an existing transaction attribute (e.g., for initiating a dispute) or to a data of an existing transaction attribute.

In some embodiments, a blockchain state observer API 210C may enable the observation, search, access or retrieval of data for any attribute of the transaction information (or data stored for the attribute) from one or more blockchain networks (e.g., blockchain network for transaction events and disputes 216), for example, by managing blockchain state observers 250 on the user devices of the end user and/or transaction participants. Thus, in some embodiments, the blockchain applications server 210 may include, among its blockchain applications, an API for the state observers 250 used by the end users, which may periodically (e.g., every second, minute, 10 minutes, hourly, daily, etc., or continuously retrieve the latest updates made to the blockchain network for transaction events and disputes 216 and present it to participants of the blockchain e.g., by decoding information via encoder/decoder 210A, or by utilizing data analytics to make the information more understandable or relatable. In some embodiments, the frequency at which a state observer retrieves the information may depend on the nature of the notification. For example, if there is a need for near-real-time settlement, then the frequency may be less than an hour. Otherwise, the frequency of the retrieval may be less frequent.

Based on the information received from a blockchain network (e.g., blockchain network for transaction events and disputes 216), the blockchain state observer 250 may also trigger a series of events based on the received information. For example, if the blockchain state observer receives information of an initiation of a transaction dispute from the blockchain network for transaction events and disputes 216, the blockchain state observer may prompt one or more parties to respond to the dispute initiation, or enable the Smart contracts 210D to resolve the dispute. Method 400, as depicted in FIG. 4 explains various events that may be triggered as a result of the received information in further detail.

In various embodiments, "Smart contracts" 210C may refer to one or more of an application, application program interface (API), software, hardware, server, or computerized transaction protocol that facilitates, verifies, and/or enforces the negotiation or performance of a contract. In various embodiments presented herein, the contract is configured to govern the payment transaction between the issuer and the merchant or merchant's acquirer. The terms of the contract may be set, for example, by the attributes 210D of the payment transaction as posted to the blockchain, and/or by predetermined rules governing the performance of the contract or dispute resolution. Participants of a dispute resolution process (e.g., consumers, issuers, merchants, acquirers, etc.,) may establish the underlying attributes 210D of the contract governing the payment transaction, and/or the underlying rules of the dispute resolution process, e.g., at the time the participants become members of the blockchain. Smart contracts 210C may then proceed to execute the payment transaction based on the underlying attributes 210D (and their values) or facilitate the dispute resolution process using the underlying rules. After a blockchain dispute resolution process is performed, the results may be posted to the shared ledger 250 of one or more blockchains, for participants of the blockchains (e.g., the parties to the payment transaction) to view. A party may not agree with the results, and may therefore reinitiate or represent a dispute. A dispute may be settled when both parties agree on the liability. There may be sophisticated rules that govern the settlement in the case both the parties do not agree or if there is a stalemate. For example, the parties may agree to split the liabilities in the case of a disagreement. Furthermore, fraudulent transactions and/or card-not-present (CNP) transactions may be prevented since a merchant or an acquirer may be able to look up this additional information in the blockchain to deny the transaction. In some embodiments, traditional methods of dispute resolution (e.g., payment network dispute resolution) may be relied on after one or more unsuccessful blockchain dispute resolution processes.

In some embodiments, if the transaction information posted to the shared ledger of blockchain network for transaction events and disputes 216 is agreed on by all participants of the payment transaction, blockchain network for settlement 212 may be used for settlement or exchange of funds between the parties of the transaction. In some embodiments, blockchain applications server 210 may facilitate communication and/or transfer data between the blockchains using inter-ledger communication protocol 210F, for example, so that blockchain network for settlement 212 may be used for settlement or exchange of funds between the parties of the transaction. The separation into different blockchain networks may help ensure that only necessary information gets transferred, e.g., to protect the privacy of the one or more participants of the transaction.

Figure 3A:
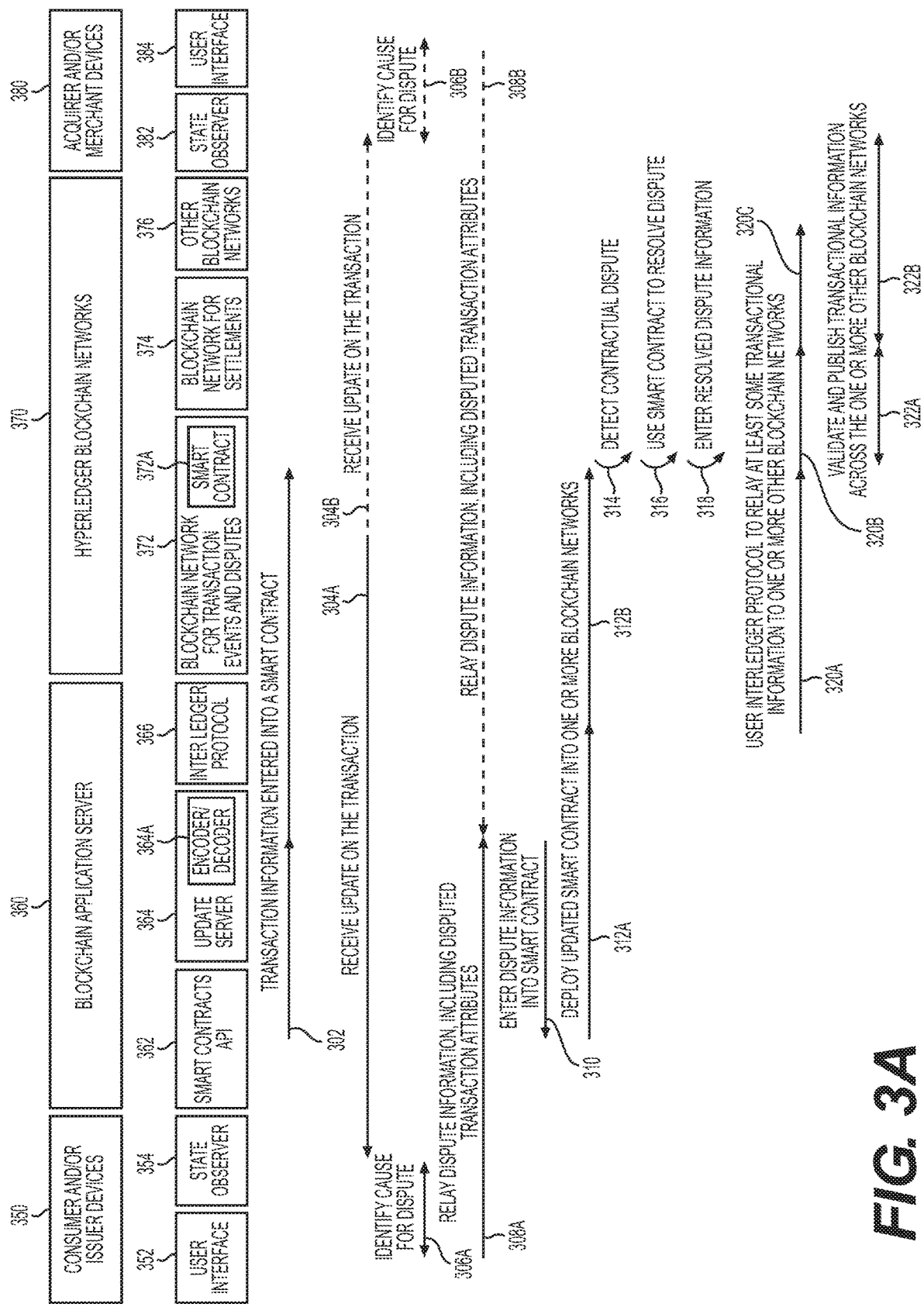
FIGS. 3A-3B depict simplified sequence flow diagrams of a method for hyperledger-based payment transactions, alerts, and dispute settlement, using smart contracts, in accordance with non-limiting embodiments.
Figure 3B:
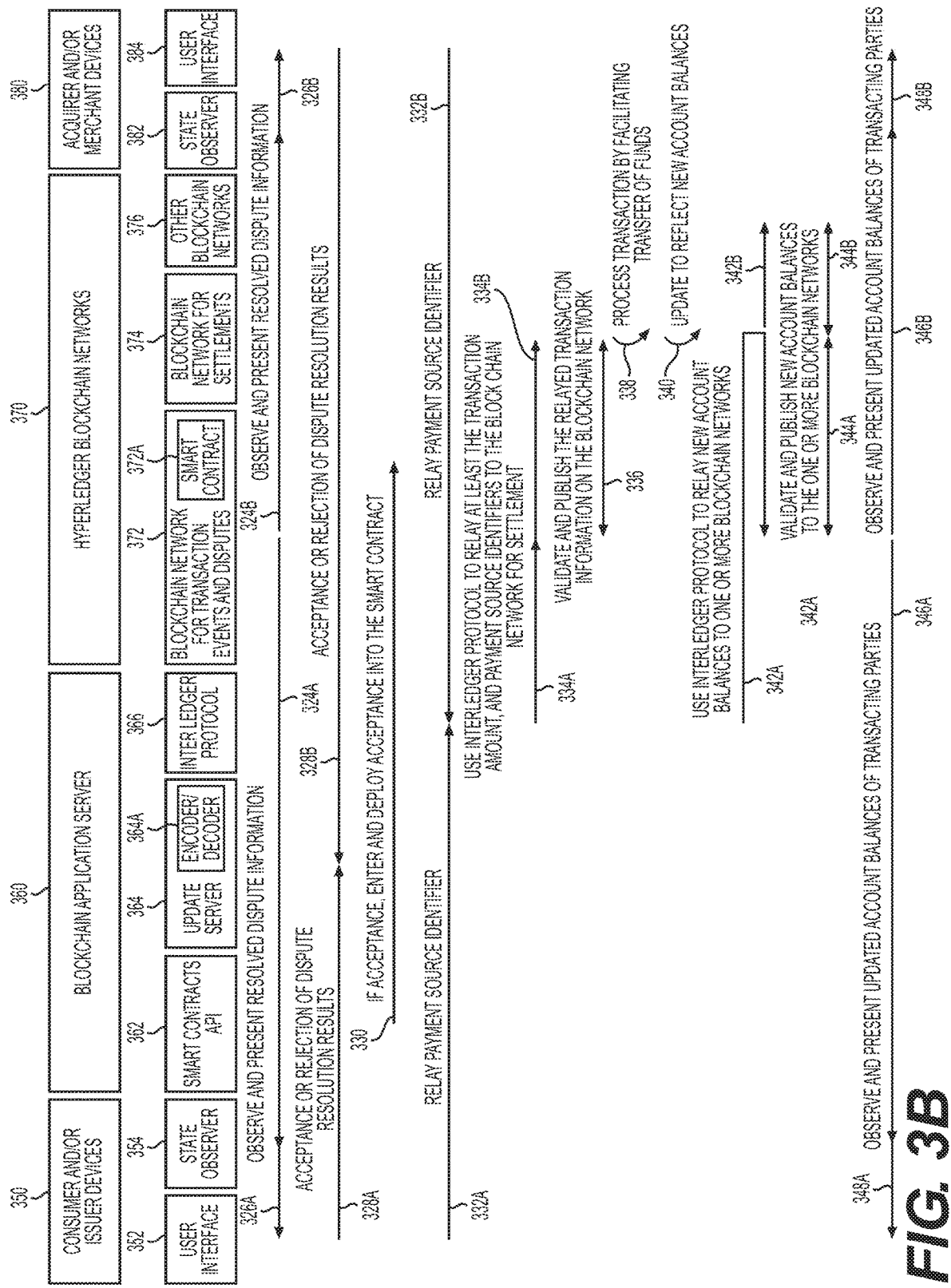

FIGS. 3A-3B depict simplified sequence flow diagrams of a method for hyperledger-based payment transactions, alerts, and dispute settlement, using smart contracts, in accordance with non-limiting embodiments.

Method 300 may be executed by the devices, systems, and/or components related to the consumer and/or issuer (e.g., "consumer and/or issuer devices" 350, which may include user interface 352, and state observer 354), blockchain applications server 360 (e.g., Smart contracts API 362; update server 364; encoder/decoder 364A; a server, system, protocol, and/or plug-in for inter ledger communication (e.g., "interledger communication protocol (ICP)" 366 and its plug-ins (e.g., ICP Plug-Ins 216C and 218C)), etc.), one or more blockchain networks of the hyperledger ("hyperledger blockchain networks" 370, which may include, e.g., blockchain network for transaction events and disputes 372, blockchain network for settlement 355B, and any other blockchain networks 376, etc.), acquirer and/or merchant devices 380 (e.g., state observer 382, user interface 384). As explained in FIG. 2, each of the one or more blockchain networks may use a ledger that may be shared by and/or may be accessible to various peers of the blockchain network. However, a ledger for one blockchain network may not necessarily have all the information regarding a transaction as a ledger for another blockchain network. This arrangement may enable a division of business functions among the various blockchain networks, for example, so that confidential and/or irrelevant information may be redacted or not shared to various blockchain networks. The peers that may share and/or access the information of a blockchain network may be a representative of or the system for various parties connected to a transaction, for example, the consumer, issuer, acquirer, and/or merchant 370. A state observer of the systems for various participants of the transaction (e.g., state observer 354 and state observer 382) blockchain applications server 360 may continually or periodically observe one or more ledgers and/or one or more blockchain networks (e.g., blockchain network for transaction events and disputes 372, trigger events based on the observations, analyze and/or present the observations (e.g., via data analytics), and/or enable the end user (e.g., consumer, issuer, merchant, acquirer) to update one or more of the blockchain networks and/or shared ledger, blockchain network for settlement via their respective user interfaces.

In process flow 306A, a consumer and/or issuer may identify a cause for a dispute. For example, a consumer may browse the consumer's bank statements using user interface 352 on a personal device of the consumer device to discover that the consumer was charged or is being charged more than what was transacted for in a payment transaction originating at a merchant. The information may be provided to use interface 352, by state observer 354, which may serve to function to relay information related to transaction events from one or more blockchain networks to the end user. Likewise, an issuer (e.g., the consumer's bank) may also discover the information on user interface 352 (e.g., on a bank's computing system), and identify a cause for dispute as in 306A. In one embodiment, the identification may also be automatic.

The identified cause for dispute ("dispute information") may include, for example, the disputed attributes of a transaction information (e.g., a disputed amount, a disputed transacted good and/or service, etc.).

In process flow 308A, the consumer and/or issuer may relay the dispute information, including transaction information and the disputed attributes of the transaction, to blockchain applications server 360 (e.g., at the update server 364). For example, an issuer may receive transaction related information from an acquirer in a transaction authorization request. An issuer may also receive transaction related information by other means, for example, by the consumer, or via saved records of past transactions originating at the merchant. An issuer may initiate a dispute, e.g., using user interface 352, if there is an inconsistency between the transaction related information received from one or more sources. It is contemplated that in some embodiments, transaction related information may be accessible to the consumer and/or issuer on user interface 352 via a state observer that periodically or continually observes, decodes, and/or publishes transaction events information from one or more blockchain networks of the hyperledger blockchain networks 370 and/or their respective ledgers blockchain network for transaction events and disputes blockchain network for transaction events and disputes and disputes 372 blockchain applications server blockchain network for transaction events and disputes blockchain network for transaction events and disputes and disputes 372. In some embodiments, transaction related information may be accessible to the participants of a transaction (e.g., including consumer and/or issuer) via a shared ledger of one or more blockchain networks (e.g., like those comprising hyperledger blockchain networks 370). Information retrieved from these blockchain networks and/or their ledgers may be decoded and/or may otherwise be rendered in a presentable format to the participants. In such embodiments, the participants of the transaction may also be participants or peers of one or more of the blockchain networks.

For information about a transaction to be presented to interested parties, it is contemplated that in some embodiments, prior to process flows 306A-308A, process flow 302 may include entering transaction information into Smart contract 372. Thus, process 302 may receiving notification of an initiation of a payment transaction, having the Smart contracts API log in data related to a transaction into a Smart contract, and then deploying and/or entering the Smart contract, into one or more blockchain networks (e.g., as in Smart contract 372A in blockchain network for transaction events and disputes 372) of hyperledger blockchain networks 370. In some embodiments, a smart contract may include data structures for entering transaction data for transaction attributes of a transaction, along with other information related to the transaction (e.g., dispute information, acceptance or rejection of a dispute, etc.), coupled with a mechanism or protocol for resolving disputes and triggering events and notifications to be presented to participants, e.g., via a state observer. The Smart contract API may be used to create a Smart contract, store information into a Smart contract, alter and/or update the Smart contract, configure and/or reconfigure the mechanisms and/or protocol for the Smart contract, and/or deploy the created and/or updated Smart contract into one or more blockchain networks. In some embodiments, a deployed Smart contract of a blockchain network may be a plug in, which may be controlled via the Smart contract API.

Subsequently, at process flow 304A-B, updates made to the transaction identified and stored in the one or more blockchain networks (e.g., blockchain network for transaction events and disputes 372) may be observed and/or received by state observer 354 and 382, respectively. In some embodiments, process flows 304A and 304B may include decoding and/or publishing the update to the end users, (e.g., consumers, issuer, acquirer, merchant). In such embodiments, the state observer may use an decoder.

In some embodiments or scenarios, for example in process flow 306B, it may be the acquirer and/or merchant that identifies a cause for a dispute (e.g., using user interface 384 of acquirer and/or merchant devices 380). The cause of dispute may be identified, for example, from the information presented by state observer 382 on user interface 384. Subsequently, in process flow 308B, an acquirer and/or merchant may relay the dispute information, transaction information, and the disputed attributes of the transaction to the blockchain applications server (e.g., to an update server 364).

Subsequent to the relaying of dispute information to the blockchain applications server (e.g., as in process flows 308A-B), at process flow 310, blockchain applications server blockchain applications server 360 may include entering the received dispute information into the smart contract blockchain network for transaction events and disputes using Smart contract API 362. In some embodiments, process flow 310 may involve identifying the smart contract for the specific transaction for which a dispute was identified. In such embodiments, the transaction may be identified by a transaction identifier or an identifier of one of the transaction participants or accounts of the transaction participants. Subsequently, process flows 312A and 312B may include deploying the updated smart contract into one or more blockchain networks and/or their respective ledgers (e.g., into Smart contract 372A of blockchain network for transaction events and disputes 372). In some embodiments, a smart contract for one blockchain network may be relayed and/or some or all of its stored information may replicated or communicated across other blockchain networks of hyperledger blockchain networks 370. Inter ledger protocol 366 of blockchain applications server 360 may guide the transfer of this information. However, in some embodiments, the various blockchain networks of hyperledger blockchain networks 370 may independently transfer and receive information from one another, e.g., via an inter ledger communication plug-in, set up by the inter ledger protocol 366 of blockchain applications server 360. In some embodiments, the development of the smart contracts API may enable participants to directly facilitate the entering in of updates and/or new information (referred to as "invoke") into a smart contract data structure (e.g., smart contract 372A) of one or more blockchain networks of hyperledger blockchain networks 370.

The process of invoking may also involve may involve encrypting and then entering the encrypted information using, e.g., update server 364 and/or encoder/decoder 364D. In some embodiments encoder/decoder 364D may be a part of and/or serve the encoding/decoding function of an update server 364D. The encryption may protect sensitive information of the consumer or merchant, and/or restrict the accessibility of the information. The dispute information may include one or more attributes of the disputed payment transaction originating at the merchant and initiated by the consumer. The attributes of the payment transaction may include, but are not limited to, e.g., an identification of the merchant, an identification of the consumer, the transaction amount, an itemization of the goods and/or services transacted for, geographical and/or temporal information of the transaction, any taxes, any tips, any discounts; any fees directed towards acquirers, issuers, payment networks; etc. The encoded dispute information may further include, but is not limited to: an identification of one or more of the attributes that is in dispute, an identification of the disputant, the disputant's proposed modification to the disputed attribute, and geographical and/or temporal information of the dispute.

The blockchain applications server may include an interface (e.g., update server 364) that may include one or more of an application, application program interface, software, hardware, server, or protocol that allows the addition of information (e.g., an attribute of the payment transaction, a proposed modification of an attribute by a disputing party, etc.) to a smart contract, smart contract plug-in or API, a blockchain network (e.g., blockchain network for transaction events and disputes ad disputes 372), and/or a shared ledger of a blockchain network. Thus, update server 350D of blockchain applications server blockchain applications server 360 may respond to requests to add attributes of a payment transaction, dispute one or more of the previously posted transaction attributes, and/or add a proposed modification to an existing transaction attribute (e.g., for initiating a dispute). In other embodiments, the update server may be separate from blockchain applications server 360 and may instead be a part of a server that also facilitates or manages state observers 354 and 382. The ledgers and/or sub-ledgers of the one or more blockchain networks of hyperledger blockchain networks 370 may be periodically and/or continually updated, and may be updated to reflect accurate details regarding the payment transaction between participants of the transaction. Blockchain state observers 354 and 382 may be installed or accessed at the devices or systems of the end users (e.g., consumers, merchants, acquirers, issuers, etc.) Blockchain state observer 354 and 382 may periodically or continually receive the latest information from one or more blockchain networks (e.g., blockchain network for transaction events and disputes and disputes 372, process and/or analyze the information, and present the information (e.g., in an understandable way) to the end users on their user interfaces 352 and 384. The end users may be participants of the transaction, who may also be member participants (e.g., peers or nodes) of one or more of the blockchain networks that comprise hyperledger blockchain networks 370. Thus, merchant 370 involved in the disputed payment transaction, acquirer 360 for merchant 370, consumer 340 initiating the payment transaction, and issuer 345 for merchant 370, as participants, may be able to understand information and/or events at blockchain network for transaction events and disputes and disputes 372, or confirm the accuracy of the payment transaction details directly from blockchain network for transaction events and disputes and disputes 364 and/or shared ledger of the blockchain, from a state observer that periodically or continually observes and receives updates of one or more blockchain networks, and/or through blockchain applications server the Smart contracts that triggers a notification of an update or a transaction event that may be captured by the state observer. blockchain network for transaction events and disputes. If one of the participants disputes the accuracy of a posted transaction attribute, the participant may initiate the process of entering the disputed information into blockchain network for transaction events and disputes blockchain network for transaction events and disputes 372 (e.g., as in process flows 302-310). The ledger may be updated and/or new details may be posted by adding blocks to blockchain network for transaction events and disputes blockchain network for transaction events and disputes and disputes 372 using pre-defined rules, e.g., agreed on by the, peers, nodes, and/or participants of a blockchain network. In other embodiments, the ledger may be updated and/or new details may be posted, using blockchain mining methods known to persons having skill in the art.

It is contemplated that in some embodiments, subsequent to process flow 312A-B, state observers 354 and 382 blockchain applications server, as part of their function to periodically or continually observe updates to one or more blockchain networks blockchain network for transaction events and disputes (e.g., blockchain network for transaction events and disputes and disputes 372) of hyperledger blockchain networks 370, may receive the update on the entered dispute information from process flows 312A-B. In some embodiments, state observers 352 and 382 may be applications of consumer and/or issuer devices 350 and acquirer and/or merchant devices 380, and the application may be managed, installed, developed, and/or deployed at blockchain applications server 360. In such embodiments, state observers, 352 and 382, may observe the entering in of the dispute information into Smart contract and simultaneously report to the end users. In other embodiments, state observers 352 and 382, may have a server of its own that may possess the ability to update, encrypt, and/or encode data into a smart contract or blockchain (e.g., via an update server, encoder/decoder).

The various blockchain networks of hyperledger blockchain networks 370 may each serve one or more functions or tasks involved in a transaction process. The division of labor across various blockchain networks enables the sharing of information necessary for a function or task, and at the same time the withholding or redacting of information that may be confidential, private, or unnecessary, in an environment that is efficient, consensus-driven, and transparent (among the peers, nodes, and/or participants of a blockchain network). For example, blockchain network for transaction events and disputes 372 may function as a record keeper for the various "events" of a transaction process. "Events" may be observed by state observers, 354 and 382. The observed events may set off one or more downstream processes, for example, by alerting participants of the event in the blockchain network or transaction, being used for data collecting and/or analytics. Alternatively, the observed event may be disregarded. As a further example of the delegation of functions or tasks among the various blockchain networks of hyperledger blockchain networks 370, blockchain network for settlements 374 (e.g., Ripple) may function as a master record keeper of account balances and fund transfers for its various member participants. Thus, blockchain network for settlements 374 may be utilized once a transaction is ready for final processing or settlement, for example, if no party disputes the transaction information in the blockchain network for transaction events and disputes 372.

At process flow 314, smart contract 372A of blockchain network for transaction events and disputes 372 may process the received information from process flow 312A-B (e.g., the entered dispute information) and detect that there is a contractual dispute. In some embodiments, various aspects of the received information may trigger the detection of a contractual dispute.

In process flow 316, blockchain applications server 360 and/or smart contract 372A stored or functioning within blockchain network for transaction events and disputes and disputes 372 (e.g., via Smart contracts API 362) may resolve the dispute related to one or more attributes of the payment transaction using predetermined rules for dispute resolution. In various embodiments of the present disclosure, attributes of the payment transaction may refer to, for example, details related to a payment transactions (e.g., an identification of the merchant, an identification of the consumer, the transaction amount, an itemization of the goods and/or services transacted for, geographical and/or temporal information of the transaction, any taxes, any tips, any discounts; any fees directed towards acquirers, issuers, payment networks; currency exchange rates; etc.). The rules of the dispute resolution may refer to procedures used for interpreting the transaction attributes, obtaining information related to the dispute, and resolving the dispute. In an alternative embodiments, process flow 316 may be performed by any computerized transaction protocol that facilitates, verifies, and/or enforces the negotiation or performance of a contract (e.g., as the one governing the payment transaction between the issuer and the merchant or merchant's acquirer) in addition or as an alternative to the smart contract system (e.g., smart contract API 362 that oversees or deploys the smart contract 372A functioning within blockchain network for transaction events and disputes 372). The predetermined rules for the dispute resolution may be set and/or agreed to by participants of the transaction and/or participants, nodes, and/or peers of a blockchain network. For example, the acquirer and the issuer may agree to use certain methods of calculating prices. In another example, the participants may agree that if the issuer approved a transaction that was associated with a fraudulent account, the issuer will not have the right to initiate a chargeback. Participants may enact rules to check for invalid disputes related to fraud, e.g., if the fraud type and the conditions do not match, for example, if the fraud type is a counterfeit fraud but the conditions indicate a theft. Participants may agree to rules to initiate settlement real-time using the blockchain infrastructure to initiate payments. Furthermore, participants may also agree that if the dispute reason is a certain category, e.g., a fraud or an authorization decline, the liable parties may be automatically assigned based upon agreed-upon electronic contracts/rules which use the data in the blockchain to assign liability and may directly initiate settlement if, for example, there is not a trace of doubt in the liable party. In some embodiments, the rules for the dispute resolution may be set by one or more applications or functions of the blockchain applications server 360 according to industry standards. In other embodiments, the rules for the dispute resolution may be borrowed from the rules used by various payment networks for the management of disputes. In a further embodiment, the rules may be determined during the original development of the smart contract at the blockchain applications server 360 via smart contracts API 362.

In some embodiments, the results of the dispute resolution (e.g., the resolved attributes of the payment transaction) may be published into one or more blockchains (e.g., blockchain network for transaction events and disputes 372), via smart contract 372A as in process flow 318). In some embodiments, results may be entered as a block into one or more blockchain networks (e.g., blockchain network for transaction events and disputes 372) of hyperledger blockchain networks 370, by update server 364. For example, a dispute may be initiated by a merchant who does not agree with a transaction amount contained within a transaction authorization request that is published in a ledger shared by participants of a blockchain network (e.g., parties to a payment transaction). The transaction amount may come to the merchant's attention after a state observer has presented it on the merchant's user interface 384. After the blockchain dispute resolution, the results may include a new block published in a ledger of one or more blockchain networks, which posts a corrected transaction amount to be deducted from the consumer's payment source. In some embodiments, process flow 318 may involve encrypting the resolved attributes using encoder/decoder 364A of update server 364.

At process flows 320A, 320B, and 320C, at least some transactional information may be published in blockchain network for transaction events and disputes 372 or its ledger, or the at least some transactional information may be entered within a smart contract stored or built into the blockchain network. The relaying of "at least some" transaction information, as opposed to "all" transaction information may ensure the privacy of some transactional information that is not necessary for the functions or tasks or functions assigned to various blockchain networks. In some embodiments, inter ledger protocol 366 of blockchain applications server 360 may facilitate the exchange of this information, for example, by serving as a focal point. In other embodiments, an inter ledger communication protocol plug-in may be present in one or more blockchain networks, and may therefore facilitate the direct exchange of information between the blockchain networks.

Subsequently, prior to adding the transferred transaction information from process flow 318 into the respective ledgers of the receiving blockchain networks, the transaction information may be validated (e.g., as in process flows 322A and 322B), using methods known to those having ordinary skill in the art. For example, peers or nodes serving as validators across blockchain networks of hyperledger blockchain networks 370 may confirm the accuracy of the received (at least some) transactional information that has been transferred from one blockchain network to another. The validation process may be conducted so as to safeguard the privacy of certain transactional information that need not be shared in one or more blockchain networks, for example, by making sure that the validating peers are authorized to access the specific transaction data being transferred. Once the transferred transaction information has been validated, it may be entered and/or encrypted into the respective blockchain network and/or its shared ledger, using methods known to those having ordinary skill in the art.

Referring now to FIG. 3B, at process flow 324A-B, state observers 352 and 382, respectively, as part of their functions to periodically or continually observe updates to the one or more blockchain networks may receive the update on the resolved dispute information that has been entered into one or more blockchain networks in the previous process flows. In some embodiments, the state observers need not wait for information to first be entered into the blockchain networks (or their ledgers or smart contracts) before observing the entered information. Thus, in such embodiments, process flow 320 and process flow 322 may occur simultaneously, e.g., the blockchain state observer may observe the entering in of the dispute results.

Furthermore, the state observers may process the received information from process flows 324A-B (e.g., the entered dispute results) and detect that a dispute was resolved. This detection may trigger state observers 354 and 382 to inform and/or present the dispute resolution results to various interested parties (e.g., consumer 340, issuer 345, acquirer 360, merchant 370, etc.) on their respective user interfaces (e.g., as in steps 326A and 326B with user interfaces 352 and 384). In some embodiments, process flows 326A and 326B may involve decoding the received information on the dispute resolution results (via an encoder/decoder built into or sourced from a server, or from encoder/decoder 364A) so that the results are readable and/or understandable. Thus, in process flows 324A, 324B, 326A, and 326B, the results of the dispute resolution may be available to issuer 345, acquirer 360, consumer 340, and merchant 370, respectively. In some embodiments, the results and/or process of the dispute resolution may be published in the shared ledger of a blockchain network (e.g., blockchain network for transaction events and disputes 372), and, if the participants of the transaction are also participants, peers, and/or nodes of the blockchain network, the results and/or process of the dispute resolution may be readily available to the participants of the transaction (e.g., issuer 345, acquirer 365, consumer 340, and merchant 370, etc.). In other embodiments, while entries in the shared ledger may be accessible to participants of the one or more blockchain networks, the state observers may present the information from the ledgers of one or more blockchain networks of hyperledger blockchain networks 370 in a form understandable to the parties. Furthermore, the entry of information into various blockchain networks, each tasked with different functions, may trigger downstream events based on the new entries, and may result in further updates in the transaction events for the one or more blockchain networks.

At process flow 328A, the consumer and/or issuer may accept or reject the results of the dispute resolution, via their respective user interface 352 blockchain applications server. Likewise, at process flow 328B, the acquirer and/or merchant may accept or reject the results of the dispute resolution, via their respective user interface 384. The acceptance or rejection of a dispute resolution result may be directed toward an update server (e.g., update server 364 of blockchain applications server 360), which may record the acceptance or rejection into one or more blockchain networks or their ledgers, and/or update the smart contract involved with the transaction. In some embodiments, the acceptance or rejection of the dispute resolution results may be made by an issuer or acquirer, but may be based on the input of consumer or merchant, respectively. Using, e.g., user interface 352 on a consumer device, the consumer may view the results of the dispute resolution process as presented by state observer 354 from the shared ledgers of the one or more blockchain networks of hyperledger blockchain networks 370. Likewise, the merchant may view the results of the dispute resolution on a user interface 384, as presented by state observer 382, blockchain applications server based on information gathered from the same shared ledger of one or more blockchain networks. If one or more of the participants of the transaction are not satisfied with the results of the blockchain dispute resolution process, the one or more participants may be able to indicate blockchain applications server that they disagree with the results ("rejection"), and may also input further information regarding the continued dispute. The one or more participants that are unsatisfied with the blockchain dispute resolution results may enter various dispute information, including, for example, any attributes of the resolved payment transaction that the one or more participants still disputes. For example, after viewing the results of the blockchain dispute resolution a merchant (or its acquirer) may still not agree with the corrected transaction amount to be deducted from the consumer's payment source to pay for the payment transaction. The merchant (or its acquirer), using user interface 384, may indicate its rejection of the results, and submit new dispute information, including the transaction amount that the merchant (or its issuer) believes to be correct. The indication of a rejection and related information may be entered into the smart contract as an update or as a new event in blockchain network for transaction events and disputes 372, for example, via update server 364. In other embodiments, the acceptance or rejection may be automatic (e.g., a detection of inconsistent data by a computing system). One or more blockchain networks (e.g., blockchain network for transaction events and disputes 372) or the smart contract involved with the transaction may use the received dispute information, including the new proposed attributes of the payment transaction, to initiate and resolve a new dispute. Thus, process flows 302 through 328A-B may be repeated until the participants agree to the results of the blockchain dispute resolution. In some embodiments, there may be rules that provide bounds on the number of times a dispute can be re-initiated. It is contemplated that in such embodiments, the smart contract rules may be configured to be at least sufficiently inclusive and versatile to handle multiple different dispute scenarios to prevent or minimize the possibility of failed dispute resolutions.

Alternatively or additionally if one or more of the participants indicate that they are still unsatisfied with the results of the blockchain dispute resolution, and present further dispute information, an application (e.g., inter ledger communications protocol 366) of blockchain applications server 360 may relay the dispute information to a payment network system conventionally used to resolve disputes, according to conventional methods known to those having ordinary skill in the art. In other embodiments, it is contemplated that the blockchain dispute settlement process may eliminate the need for payment network dispute settlement, and thereby prevent the need for maintaining two dispute settlement systems for a potential dispute. In further embodiments, it is also contemplated that any dispute settlement may be confined to the blockchain dispute settlement process, e.g., to reduce the cost of having to maintain more than one dispute settlement systems.

In some embodiments, the results of a dispute settlement may be readily available to the issuer, acquirer, consumer, and merchant, as participants, peers, and/or nodes in a blockchain network, via a shared ledger that may be viewed, or its information presented by a state observer, for example on a user interface or computing system. In such embodiments, the results and/or process of the dispute resolution may be published in blockchain network for transaction events and disputes 372, which may be readily available to the participants of the blockchain network (e.g., issuer, acquirer, consumer, merchant, etc.) or may be presented by the state observer in a way that is readable and understandable to the parties.

If there is no dispute as to the results of the dispute settlement, and/or the parties to the transaction (or participants of the blockchain network for transaction events and disputes 372) consent to the validity of the corrected transaction information, process flows 334A and 334B may include relaying at least some of the transaction information to one or more blockchain networks tasked with the processing of the transaction, which in the exemplary flowchart of FIG. 3A-3B is blockchain network for settlement 374. The processing of the transaction or settlement may include, but is not limited to for example, a task of recording the transfer of resources or funds from the payment accounts of two or more parties to a transaction. The at least some of the transaction information may include for example, the amounts of a fund or resources to be transferred and the identities of the parties and/or the accounts of each party (e.g., payment source identifiers) from which to be transacted. Thus, in some embodiments, prior to process flows 334A, and 334B, process flows 332A-332B may include relaying the payment source identifiers of the transaction participants from which to transfer funds, to the one or more blockchain networks tasked with the settlement.

For example, process flow 332A may include relaying the consumer's or issuer's PAN, cryptocurrency ID, and/or other account identifier to blockchain network for settlement 374. Likewise, process flow 332B may include relaying the merchant's or acquirer's issuer's PAN, cryptocurrency ID, and/or other account identifier to the blockchain network for settlement 355B. In some embodiments, the respective payment source identifiers may already be stored within smart contract 372A, and may merely be transferred to blockchain network for settlement 374, e.g., using inter ledger protocol 366 or its localized plug-in.

The transfer of the at least some transaction information and/or the transfer of the payment source identifiers to the relevant blockchain networks (e.g., blockchain network for settlement 374) may be facilitated by inter ledger communication protocol 366 of blockchain applications server 360, or inter-ledger communication protocol plug-ins in one or more blockchain networks, similar to methods described in process flows 320A-C.

Subsequent to receiving the at least some transaction information, and the payment source identifiers, and prior to entering the received information into block(s), and/or a ledger, blockchain network for settlements 374, may validate the received information across other blockchain networks (e.g., blockchain network for transaction events and disputes 372), in process flow 336. Upon validation, the transferred information and/or payment source identifiers, may be added as a block in the relevant blockchain network.

The validation and addition in process flow 336 may be to the method described in process flows 322A-B.

The relayed transaction information and various account IDs, PANs, or cryptocurrency IDs may be published and/or encrypted into blockchain network for settlement 374 using update server 364 and encoder/decoder 364A.

In some embodiments, the blockchain network for settlement 374 may be a real-time gross settlement system (RTGS), which may facilitate the exchange of a currency or cryptocurrency and serve as a remittance network, and which may be designed to comply with risk, privacy and compliance requirements (e.g., Ripple). Thus, at process flow 338, the transaction may be processed by facilitating the transfer of funds or resources from the respective accounts of the parties to the transaction. At process flow 340, blockchain network for settlement 374 may be updated (e.g., via update server 364, encoder/decoder 364A, or the smart contract) to reflect the new balance of the accounts for the participants of the transaction.

Upon settlement, process flows 342A-B may include relating the at least some of the updated transaction information (e.g., updated account balances) to one or more blockchain networks. Inter-ledger communication protocol 366, and/or its plug-ins deployed across one or more blockchain networks may facilitate the transfer of the information. The distribution of the information need not be all the updated transaction information, for example, to ensure the privacy and security of confidential information. Process flow 342A-B may use methods similarly described in process flows 334A-B and 320A-C.

Subsequent to receiving the at least some updated transaction information (e.g., the updated account balances), and prior to entering the received information into block(s), and/or ledger(s), the receiving blockchain networks may validate the received information across other blockchain networks (e.g., blockchain network for settlements 374), in process flows 322A-B. Upon validation, the transferred information may be added as a block or entered into the shared ledger of the relevant blockchain network. The validation and addition in process flows 344A-B may be similar to the method described in process flows 322A-B.

It is contemplated that as other blockchain networks (e.g., as in other blockchain network 376) receive relevant transaction information, these blockchain networks may use the information to fulfil the specific business function assigned to that blockchain. The completion of these functions or tasks, or steps involved in them, may be transaction events that may be entered into as blocks in the blockchain networks or their respective ledgers, or embedded smart contract. Furthermore, these transaction events may be observed by state observers 354 and 382, to be presented to the end users.

At process flows 346A-B, state observers 352 and 384, as part of their function to periodically or continually observe updates to the one or more blockchain networks of hyperledger blockchain networks 370, their ledgers, or their smart contract stored or embedded within the blockchain networks, may receive an update to the accounts of transacting parties by observing blockchain network for settlement 374. At process flows 348A-B, state observers 352 and 382, respectively, may decode and/or otherwise make accessible, information of the updated account balances to the transacting parties (e.g., consumer 340, issuer 345, acquirer 365, merchant 370, etc.). The state observers or the blockchain applications server may be configured to ensure privacy, for example, so that each transaction participant may be only allowed to see their own account balances. In some embodiments, parties may be able to view their new account balances readily via a shared ledger of the blockchain network for settlement 355B, e.g., if they are peers or nodes of the blockchain network, or via other means.

The end users (e.g., consumer, merchant, acquirer, issuer, etc.) of the systems for payment transactions presented herein may be able to view the processes involved, including the transfer of funds, via a front-end integration using a Microservices based architecture. While settlement of funds (e.g., using blockchain network for settlement) can be driven by events generated from the blockchain network for transaction events and disputes 372 (e.g., a resolution or a lack of a transaction information dispute), transaction events may also lead to further events other than a settlement of funds. These other events may include, but are not limited to fraud events, risk or compliance events, etc. It is contemplated that other blockchain networks may be used like the blockchain network for settlement for the purpose of managing or recording these various functions driven by the events.

These events can be choreographed using Micro Services as opposed changing the front-end or using orchestration. There are significant benefits tied to using a Microservices based architecture to decouple applications and employing a development operations (DevOps) approach for development and scaling the services independently, the benefits including but not limited to continuous delivery and deployment. It is contemplated that architectures similar to or providing benefits as Microservices may also be used. Microservices may refer to individual services provided to the end user, to enhance the user's interaction with various blockchain networks. In some embodiments, Microservices may interact with queues to publish updates and/or other services with specific functions, e.g., settlement services, notifications. For merchants, Microservices may enable a queue to be read and nay perform settlement. Furthermore, Microservices may display various information, e.g., in a customer service portal. Thus, Microservices may be designed to perform very specific functions well and may have its own infrastructure and repository, and hence can be scaled independently of other micro services depending on the volume and traffic. The Microservices component may adds additional flexibility to the overall architecture.

FIGS. 4A-4B depict block diagrams of a general method for implementing smart contracts for use in hyperledger-based payment transactions, alerts, and dispute settlement, in accordance with non-limiting embodiments. Moreover, FIG. 4A may describe one embodiment of a method for developing a smart contract that may be used in one or more blockchain networks. FIG. 4B may describe one embodiment of a method of using a smart contract to store transaction information.

Thus, referring to FIG. 4A, step 402 may include developing data structures for transaction attributes and/or mechanisms for transaction events and/or dispute settlement. Step 402 may be performed by a developer using a software development kit (SDK), for example, a smart contract SDK. The data structures may be used to store transaction information while the mechanisms may provide the basis for dispute settlement, transaction processing, transaction event generation, access, and updating, Step 404 may include enabling connection with transaction participants and one or more blockchain networks of a hyperledger. Step 406 may include deploying smart contract on to the one or more blockchain networks. In various embodiments presented herein, the deployed smart contract in the blockchain network may also be referred to as a smart contract plug in. An application or service used to add, update, deploy, and/or configure a smart contract may be referred to as a Smart contract API, which may be one of a number of applications within a blockchain applications server.

In some embodiments, step 408 may include enabling the communication or relaying of information across the one or more blockchain networks. Step 408 may be accomplished, e.g., using an inter ledger communication protocol.

In some embodiments, method 400A may further include step 404A, which may include enabling participants to query, invoke, and/or receive event notifications. The participants may be transaction participants, and/or peers or nodes of a blockchain network of a hyperledger. A query function may enable a participant to locate or identify the existence of a data that may be stored within the smart contract. An invoke function may enable the participant to add and/or update a smart contract, at least indirectly. Transaction events and/or updates made to a smart contract may be received and presented to the participant via a state observer.

Referring now to FIG. 4B, step 410 may include receiving indication of an initiation of a payment transaction and an identifier of the transaction. In some embodiments, the identifier may serve as or indicate the initiation.

Step 412 may include entering and/or encoding the initiation of the payment transaction on to a smart contract. The smart contract may be deployed, e.g., as a plug in, across one or more blockchain networks of a hyperledger. In some embodiments, the initiation may be an identifier of a transaction, or an identifier of a transaction participant (e.g., address) or the payment account of the participant. The encoding may be performed by an encoder/decoder or a similar encryption system. In some embodiments, the initiation (or any subsequent entries) may be directly entered into the smart contract of the one or more blockchain networks. In other embodiments, entries may be transmitted first to the smart contracts API, e.g., on a blockchain applications server, and then subsequently entered. The entry may also act as an update to an existing smart contract already deployed in one or more blockchain networks.

Step 414 may include enabling the updating of the smart contract based on subsequent transaction events. For example, step 414 may include developing a mechanism by which transaction events (e.g., approval by an acquirer, initiation of a dispute, etc.) can be logged into the smart contract, as further data regarding a transaction. In some embodiments, updating may include tracking or identifying a transaction using an addressing system (e.g., identifier of the transaction, transaction participant, or a payment account).

Thus, through steps 412 and 414, transaction information pertaining to a transaction may be entered, via the smart contract, to one or more blockchain networks. For example, a data structure in the smart contract may encodes (e.g., using an encoder/decoder) the attributes of an initiated transaction (e.g., merchant and/or acquirer ID; transaction amount; issuer and/or consumer ID; description and/or ID of transacted good(s) and/or services; geographical and/or temporal information; taxes, tips, and/or discounts; any fees to be directed to acquirers/issuers, etc.)

Step 416 may include enabling the observation of the updates to the smart contract. The observations may be made by a state observer, which may be installed, or be made available on a user interface of a user device of a transaction participant.

Figure 5:
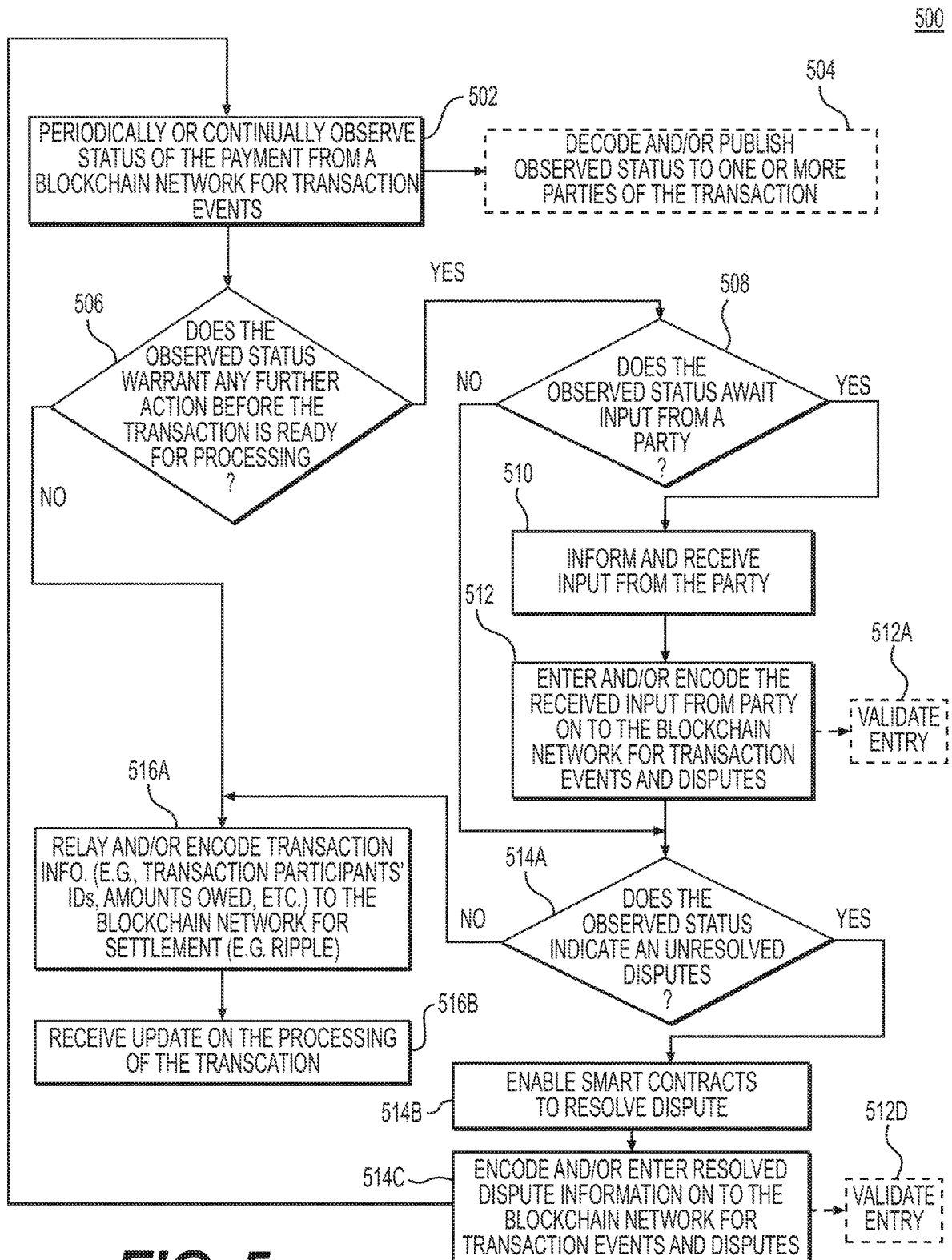
FIG. 5 depicts a block diagram of a general method for processing and executing upon information received by a state observer from multiple blockchain networks, in accordance with a non-limiting embodiment.

FIG. 5 depicts a block diagram of a general method 500 for processing and executing upon information received by a state observer, in accordance with a non-limiting embodiment. Moreover, information may be received periodically and/or continually from the blockchain, e.g., via the blockchain state observer, which may present this information to various participants of a transaction on their user interfaces. In some embodiments, this state observer may be a distant server, managing applications, plug-ins, and/or software of the state observers installed in the user devices of the transaction participants. In such embodiments, a state observer API may be part of the one or more applications, programs, or protocols that may comprise the blockchain applications server. Various events may be generated based on the information received by the state observers. Some events may involve, for example, storing information into a data store, and this information may be used for data analytics, or be presented via a Smartbot to a user. Furthermore, some events may involve, for example action notifications that may kick-off downstream activities, for example, settlement or dispute notice generation. In at least some embodiments of the present disclosure, a blockchain network (e.g., blockchain network for transaction events and disputes) and/or its shared ledger may record the series of events for a transaction, from which the blockchain applications server may observe and generate downstream events, if needed and/or merely alert participants of the transaction of the event. The generation of downstream events may include prompting the user to enter an input, that may be relayed to one or more applications of the blockchain applications server. Alternatively or additionally, the user input may be relayed directly to one or more blockchain networks, their ledgers, and/or a plug-in or application (smart contract) stored or deployed within the one or more blockchain networks.

In an exemplary embodiment, the blockchain state observer receives the information from the blockchain state observer, its shared ledger, or smart contract deployed in the blockchain network. The received information may be a transaction event of a series of transaction events for a transaction. In some embodiments, the series of transaction events for a transaction may signify the various events that occurred during the course of a transaction, e.g., from its initiation at a merchant by a consumer to the initiation of a dispute. Further, each transaction event may be added to the blockchain network for transaction events and disputes, its shared ledger, or a smart contract involved in the transaction and stored in the blockchain network. The added transaction event may be in a chronological order or may be time-stamped. Thus, in some embodiments, a state observer may receive information about a transaction, as each new transaction event is added to the blockchain network for transaction events and disputes and/or shared ledger of the blockchain.

In some embodiments, prior to the blockchain applications server being able to receive information about a payment transaction, a payment transaction may be initiated, for example, using method 400B of FIG. 4B. Thus, a payment transaction may be initiated by entering transaction information on to one or more blockchain networks (e.g., via smart contract) of a plurality of blockchain networks. These blockchains may each be involved in the various functions or business of a payment transaction. For example, a blockchain network for transaction events and disputes may serve as a record keeper for the various events involved in a payment transaction originating at a merchant. A blockchain network for settlement may be involved in the final transfer or settlement of a currency or cryptocurrency between participants of a transaction. Having a plurality of blockchains may ensure that information may be shared by some member participants but kept private from other member participants of the payment transaction. Having a separate blockchain network for settlement (e.g., Ripple) may also assist in the compliance of the blockchain-based payment system with regulations and standards of the financial industry.

Thus, step 502 may include continually or periodically observing status of the transaction from the blockchain network for transaction events and disputes, from its ledger, and/or from smart contracts stored within. New events pertaining to the ongoing transaction may be accessed and observed using an addressing system (e.g., transaction identification, an identifier of a participant, payment account, etc.). In some embodiments, the transaction identification may serve as a key to access information regarding the attributes of the payment transaction. The observed status may include, for example, a step in the payment transaction process, an initiation of a dispute regarding the payment transaction, a step in the dispute settlement process of the payment transaction, etc. While other blockchain networks may be observed, in an exemplary embodiment, the state observer my observe the status from the blockchain network for transaction events and disputes, as it may serve as a record of events that take place through a payment transaction.

Step 504 may include decoding and/or publishing the observed status to one or more parties of the transaction. The decoding and/or publishing may be performed by an encoder/decoder or like system, which may be one of a number of applications provided by the blockchain applications server so that the results are readable and/or understandable. The published status may be accessible to interested parties (e.g., merchant, consumer, acquirer, issuer, etc.), for example, via a user interface on a user device. Alternatively or additionally, the state observer may independently have an encoder/decoder system, and the state observer may be distinct from the blockchain applications server.

Figure 6A:
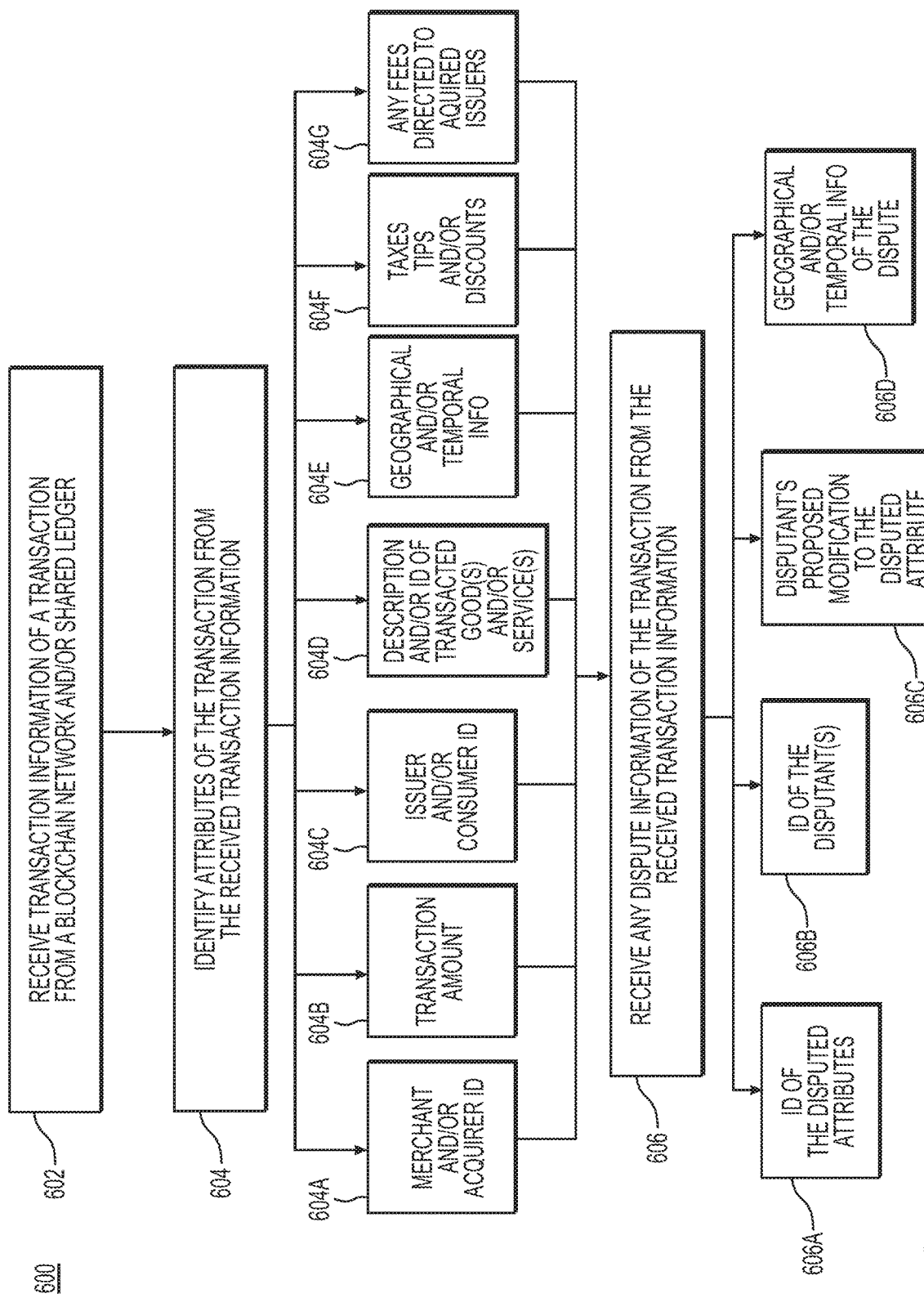
FIGS. 6A-6B depict block diagrams of a general method of analyzing data received from multiple blockchain networks by a state observer, in accordance with non-limiting embodiments.
Figure 6B:
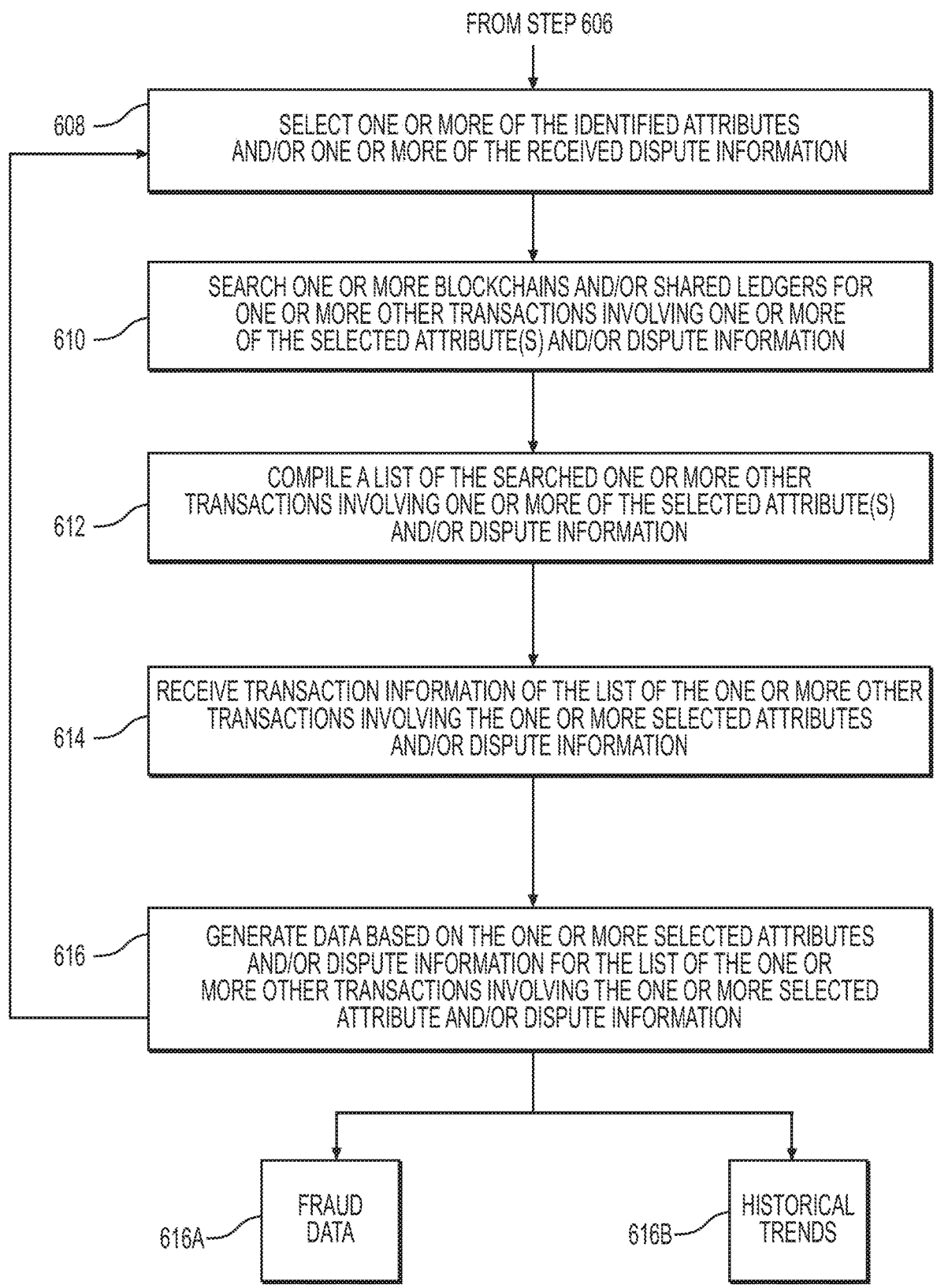

Step 506 may include determining whether the observed status warrants further action before a transaction is ready for processing. Various statuses may warrant action, and this may involve determining, for example, whether the observed status is awaiting for an input (e.g., a response) from a party (e.g., as in 508), and/or determining whether the observed status indicates an unresolved dispute (e.g., as in step 514A). In some embodiments, if the user has indicated through an input, via a user interface, to perform data analytics for one or more attributes of the transaction, the observed status may warrant a further action to perform and display data analytics for the one or more attributes of the transaction, as will be described in further detail in method 600 as depicted in FIGS. 6A-6B. The user input may be relayed to the state observer, which may retrieve further information from one or more blockchain networks, to deliver data analytics to the user, e.g., on a user interface.

Therefore, in one embodiment, if at step 506, the state observer determines that the observed status warrants further action before the transaction is ready for processing, subsequent steps would involve determining the further action. For example, step 508 may include determining whether the observed status awaits input from a party of the transaction. In some embodiments, the party of the transaction may be a member participant of a blockchain and/or shared ledger (e.g., a participant of the blockchain network for transaction events and disputes).

If, at step 508, the blockchain state observer determines that the observed status is awaiting for an input from a party, the state observer may inform the party and receive the awaited input from the party (e.g., as in step 510B). Furthermore, a party may already be informed of the observed status and the awaited and/or requested input, for example, from step 504. In such embodiments, a party may merely respond and/or may provide an input based on the information published in step 504. At step 512, one or more applications (e.g., an update server, encoder/decoder, or smart contracts) of the blockchain applications server may encode and/or enter the received input from the party on to the blockchain network for transaction events and disputes, a shared ledger of the blockchain network, or the smart contract of the transaction within the blockchain network. Alternatively or additionally, the received input may be published and/or otherwise be accessible to one or more parties of the transaction (e.g., as in step 504).

As or before the input is entered and/or encoded into the blockchain network for transaction events and disputes, the proposed entry may be validated, for example, from validating nodes or peers of the blockchain network (e.g., as in step 512A).

Subsequently, the state observer may proceed to step 514A, which may involve determining whether the observed status indicates an unresolved dispute.

Additionally, if, at step 508, the state observer determines that the observed status is not awaiting for an input from a party, the state observer may subsequently determine, at step 514A, whether the observed status indicates an unresolved dispute. In some embodiments, there may be an indication of an unresolved dispute if there are conflicting entries or data for a transaction attribute (e.g., the merchant and consumer contest the amount of a transaction good(s) and/or service(s)). The conflicting entries may be detected from a smart contract application in the blockchain network for transaction events and disputes by the blockchain applications server, for example, if two differently timestamped blocks have inconsistent data entries for the same transaction attribute of the same transaction.

If, at step 514A, the state observer determines that the observed status indicates an unresolved dispute, step 514B may include enabling Smart contracts to resolve the dispute. Step 514A may involve prompting the user to transmit a signal or request, via a user interface, to one or more application servers or programs (e.g., smart contract API) of the blockchain application server to have smart contract or directly to a smart contract plug-in or application stored within a blockchain network.

Smart contracts may also be used to exchange money or anything of value in general. For example, a smart contract may be a logical construct that may be executed when a dispute reaches a certain state. For example, if there is a duplicate transaction in the receipt attributed to a cardholder, it may be the case that a cardholder would not be held responsible for the additional transaction if he or she did not make that transaction. A blockchain network may be updated and indicate a state change of "transfer funds back to cardholder." The state change may be indicated using specific codes, and the state may be reflected on each node of the blockchain network governing a dispute. Once this happens, the money may change hands. A smart contract may facilitate and/or enhance this process. In the above example, a smart contract may credit the card holder through the Issuer or financial institution that the card holder interacts with and send debit to the merchant. Similarly, if a card holder were to be found liable, the card holder may be penalized, e.g., for a friendly fraud, which might limit the card holder's ability to initiate disputes in the future. Thus, a smart contract may define the rules and penalties around an agreement in a similar method of a traditional contract, and may also automatically enforce those obligations. Intermediaries need not be required for a smart contract to be completed.

At step 514C, an application or program of the blockchain applications server (e.g., update server, encoder/decoder, smart contract API, etc.) may encode and/or enter the resolved dispute information (from step 514B) on to the blockchain network for transaction disputes and events, its shared ledger, or its stored smart contract.

Alternatively or additionally, the resolved dispute information may also published in a ledger of a blockchain network where the transaction participants are members and thereby made accessible to the transaction participants (e.g., as in step 504).

On the other hand, if the state observer determines, at step 514A, that the observed status does not indicate an unresolved dispute, the state observer or the user may prompt one or more application servers or programs of the blockchain applications server to relay and/or encode the transaction information to another blockchain network (e.g., blockchain network for settlement) of the plurality of blockchain networks (e.g., as in step 516A). If at step 506, the state observer determines that the observed status does not warrant any further action before the transaction is ready for processing, the state observer or the user may also prompt one or more application servers or programs of the blockchain applications server to relay and/or encode the transaction information to another blockchain (e.g., blockchain network for settlement) of the plurality of blockchain networks (e.g., as in step 516A). This blockchain (e.g., blockchain network for settlement) may be in charge of recordkeeping account data of the various participants of the transaction. The transfer of pertinent transaction information by the blockchain applications server may involve, for example, an inter ledger communication protocol, as known by persons having ordinary skill in the art. The pertinent transaction information may include, for example, the transaction participants' identifications, for the blockchain network for settlement to appropriately track the accounts of the participants, the amounts owed or to be transferred for each participant, etc.

Subsequently, the blockchain applications server may then process the transaction and update the blockchain network for settlement and/or shared ledger of the blockchain network. Thus step 516B may include receiving an update of the processing of the transaction, e.g., by the blockchain network for settlement. The processing and updating of the transaction may include, for example, adding or updating the blocks of the blockchain network for settlement that indicates new account balance for the participants of the transaction that are involved in the exchange of funds. The new account balance can reflect currency, cryptocurrency (e.g., bitcoins, Litecoins, etc.), commodities, etc.

For example, Bitcoin, a cryptocurrency, may be a completely decentralized digital payment system peer to peer (p2p) system enabling settlement or transactions to take place between two parties without an intermediary. Each party may identify the other party using a public bitcoin address and do not know anything in addition to that about the other party. The blockchain network for settlement may use this bitcoin address to track the transaction participant's account for the purpose of updating and recording the transfer of bitcoins for the transaction.

In such embodiments, the transactions may be verified by network nodes of the blockchain (e.g., blockchain network for settlement) and may be recorded in a public or private ledger of the blockchain.

It is also contemplated that cryptocurrency other than bitcoins may be used for the processing of the transaction. Using other forms of cryptocurrency may overcome the growing problem of "Bitcoin latency," where verifying a transaction takes an inconveniently long time (e.g., approximately 43 minutes). "Bitcoin latency" may partially stem from the fact that participants and/or members of a transaction (e.g., consumers, issuers, merchants, acquirers, etc.) may add a fee to every bitcoin transaction, which may bump that transaction up in a queue. This may result in those who could not pay such a fee (or could not pay a sufficiently big fee) to wait hours and sometimes even days for a transaction to complete.

Therefore, in some embodiments, Litecoin may be an alternate cryptocurrency that may be used in the processing of the transaction, e.g., by a blockchain network for settlement. Litecoin may be a peer-to-peer cryptocurrency and open source software project released under the MIT/X11 license, and may be inspired by and/or be technically nearly identical to bitcoin (BTC), Litecoin creation and transfer may be based on an open source protocol and thus may decentralized. The Litecoin Network aims to process a block every 2.5 minutes, and may therefore allow for faster transaction confirmation A drawback to Litecoins may include a higher probability of orphaned blocks in the blockchain (e.g., blockchain network for settlement). Advantages of using Litecoins may include, for example. greater resistance to a double spending attack over the same period as a bitcoin. However, the total work done may be a consideration. For example, if the Litecoin Network has comparatively ten times less computing work done per block than the bitcoin network, the bitcoin confirmation may be around ten times harder to reverse, even though the Litecoin Network may be likely to add confirmation blocks at a rate that may be four times faster. Nevertheless, alternate cryptocurrencies like Litecoins, may be able to overcome regulatory and/or compliance issues that may result from adopting a public bitcoin network for the cryptocurrency used in processing the transaction, e.g., in step 516B. In some embodiments, subsequent to resolving a dispute or processing a transaction, the state observer may continue to periodically or continually observe the status of the payment transaction (e.g., as in 502) and repeat one or more of the steps described above.

In one or more embodiments, the published records of transaction information and dispute information (e.g., in the blockchain network for transaction events and disputes) may be periodically or continually retrieved and stored in computing systems in addition to or other than the user devices of the participants of transaction or the one or more of the blockchain networks. The stored transaction information and dispute information may be periodically or continually analyzed to generate information (e.g., data analytics) that may be useful to other participants of the transaction or the plurality of blockchain networks.

FIGS. 6A-6B depict block diagrams of a general method of analyzing data received from multiple blockchains, in accordance with non-limiting embodiments. Method 600 may be performed by the state observer, which may, at the request of a participant or user (e.g., consumer, merchant, acquirer, issuer, etc.) periodically or continually observe the status of a blockchain (e.g., blockchain network for transaction events and disputes) and/or its shared ledger pertaining to a payment transaction or dispute, receive information from one or more blockchain networks (e.g., blockchain network for transaction events and disputes) comprising a hyperledger system and/or their ledgers, the information pertaining to a payment transaction or dispute, and perform a data analysis. In other embodiments, method 600 may be performed by a computing system and/or server that may be a participant or that may be able to access one or more blockchain networks (e.g., blockchain network for transaction events and disputes) comprising a hyperledger system or their ledgers, and retrieve transaction information of transactions and/or dispute information regarding dispute settlement processes involving the transactions.

Step 602 may include receiving transaction information of a transaction from one or more blockchain networks comprising the hyperledger or their ledgers. For exemplary purposes, the blockchain network for transaction events and disputes, described in various embodiments, may be used for receiving the information from. In order to receive the transaction information, the blockchain applications server may retrieve transaction information using a transaction identifier, for example, based on the request or input by a participant of the blockchain or payment transaction, or as part of a periodic routine. In some embodiments, step 602 may be performed by a computing system or server of a participant of the blockchain network or its shared ledger in which the transaction information has been encrypted or stored (e.g., in a block and/or smart contract). The transaction information may include various attributes of the transaction, which may be identified in step 504. For example, the attributes of the transaction may include, but are not limited to, e.g., an identification of the merchant and/or acquirer (e.g., merchant and/or acquirer ID 604A), the transaction amount(s) of one or more transacted good(s) or service(s) 604B, an identification of the issuer and/or consumer (e.g., issuer and/or consumer ID 604C), a description and/or identification of the transacted good(s) and/or service(s) 604D, geographical and/or temporal information of the transaction 604E, any taxes, tips, and/or discounts 604F; and any fees directed to the acquirer or issuers 604G (e.g., markup fees, interchange fees, etc.).

Alternatively or additionally, step 606 may include receiving any dispute information of the transaction from the blockchain network or its shared ledger. In order to receive the dispute information, the state observer may use a transaction identifier to access blocks of the blockchain network and/or its shared ledger having information on the latest update and/or status. Like step 602, in some embodiments, step 606 may be performed by a computing system or server of a participant of the blockchain network or its shared ledger in which the dispute information has been encrypted or stored (e.g., in a block or data structures of a smart contract). The dispute information may include, but are not limited to: an identification of one or more of the attributes that is in dispute 606A, an identification of the disputant(s) 606B, a disputant's proposed modification to the disputed attribute 606C, and geographical and/or temporal information of the dispute 606D. It is contemplated, however, that there may not have been any disputes for some transactions whose information may be stored in and/or published in the shared ledger, and for whom transaction information may be received in step 602. In such embodiments, step 606 may not be performed.

Step 608 may include selecting one or more of the identified attributes and/or one or more of the dispute information, e.g., for further analysis. In some embodiments, the selection may be made on the basis of a user input. For example, a user (e.g., a fraud prevention service) may be interested in knowing more about the disputant to a transaction. In such an example, the user may input the selection of the disputant, via a user interface, so that the state observer may determine, e.g., whether the disputant in a transaction has a history of initiating frivolous disputes in other transactions.

Step 610 may include searching one or more blockchain networks (e.g., blockchain network for transaction events and disputes) and/or their shared ledgers for one or more other transactions involving one or more of the selected attribute(s) and/or dispute information. For example, a user may want to know other transactions involving the same disputant as the transaction whose information was received in step 602. In another example, a user may want to know other transactions involving the same good and/or service transacted for in the transaction whose information was received in step 602. The searched blockchain and/or shared ledger may be the same as that from which the transaction information was received in step 602. Alternatively or additionally, the searched blockchain and/or shared ledger may be different, or may involve different participants.

Step 612 may include compiling a list of the searched one or more other transactions involving the one or more selected attribute and/or dispute information.

Step 614 may include receiving transaction information for the one or more other transactions involving the one or more selected attribute or dispute information. For example, if the transaction information received in step 602 involved a transaction of an airline flight, and a user had selected (via user input) to receive more information about other transactions involving the same airline flight, step 614 may include receiving transaction information (e.g., attributes) of the other transactions involving the airline flight. Each of the other transactions may have its own transaction information with its own set of attributes. For example, the user may be able to know of other merchants, consumers, issuers, and/or acquirers involved in the airline flight purchase, transaction amounts for those other transactions involved in the airline flight purchase, etc. This information may be useful, for example, to see inconsistencies in transaction amounts, or to detect a fraudulent party.

Step 616 may include generating data based on the one or more selected attribute or dispute information of the received transaction information (e.g., from step 602) for the one or more other transactions involving the one or more selected attribute or dispute information. In various embodiments presented herein, the generated data may be collectively referred to as "blockchain analytics." For example, if the attribute of the original transaction that had been selected in step 608 to be analyzed is the consumer of the original transaction, blockchain analytics may show other trends based on other transactions of the consumer. These other transactions of the consumer may not have the rest of the same attributes as the original transaction. For example, these other transactions may be between the consumer and other merchants, for different good(s) and/or services, or conducted in entirely different geographical and/or temporal settings. The generated blockchain analytics may provide trends 616B in the consumer's other transactions, for example, the number of transactions conducted by the consumer over time, an inclination of the consumer towards transacting with certain merchants and/or merchant groups or for certain good(s) and/or services over time, and etc. In some embodiments, blockchain analytics may provide key statistics (e.g., mean, median, correlational data, etc.) for the one or more attributes of the original transaction, as being used in other transactions, for example. The key statistics may help identify patterns in the attribute (e.g., consumer behavior) that indicate fraud and/or initiate disputes.

Alternatively or additionally, step 616 may include generating blockchain analytics to analyze disputes/fraud data 616A to enable merchants and issuers (FIs) to reduce to occurrences of fraud. The fraud may include unintentional, "friendly" fraud and/or other types. For example, if one or more attributes being analyzed includes the good and/or service being transacted for in the original transaction, and the blockchain analytics indicates (e.g., in the trends 616B) that the particular good and/or service being transacted for has caused disputes or has been found to be fraudulent in multiple other transactions, a participant of the original transaction (e.g., merchant or consumer) who is seeking to transact the good and/or service may use this data to stop the transaction, and thereby prevent a future fraud from occurring. Thus, participants of the original transaction (e.g., merchant, consumer, etc.) may use the blockchain analytics data to pro-actively identify a fraudulent transaction and stop the shipment of goods/services. Analyzing trends 616B may lead one to predict future fraud or to prevent disputes.

Figure 7A:
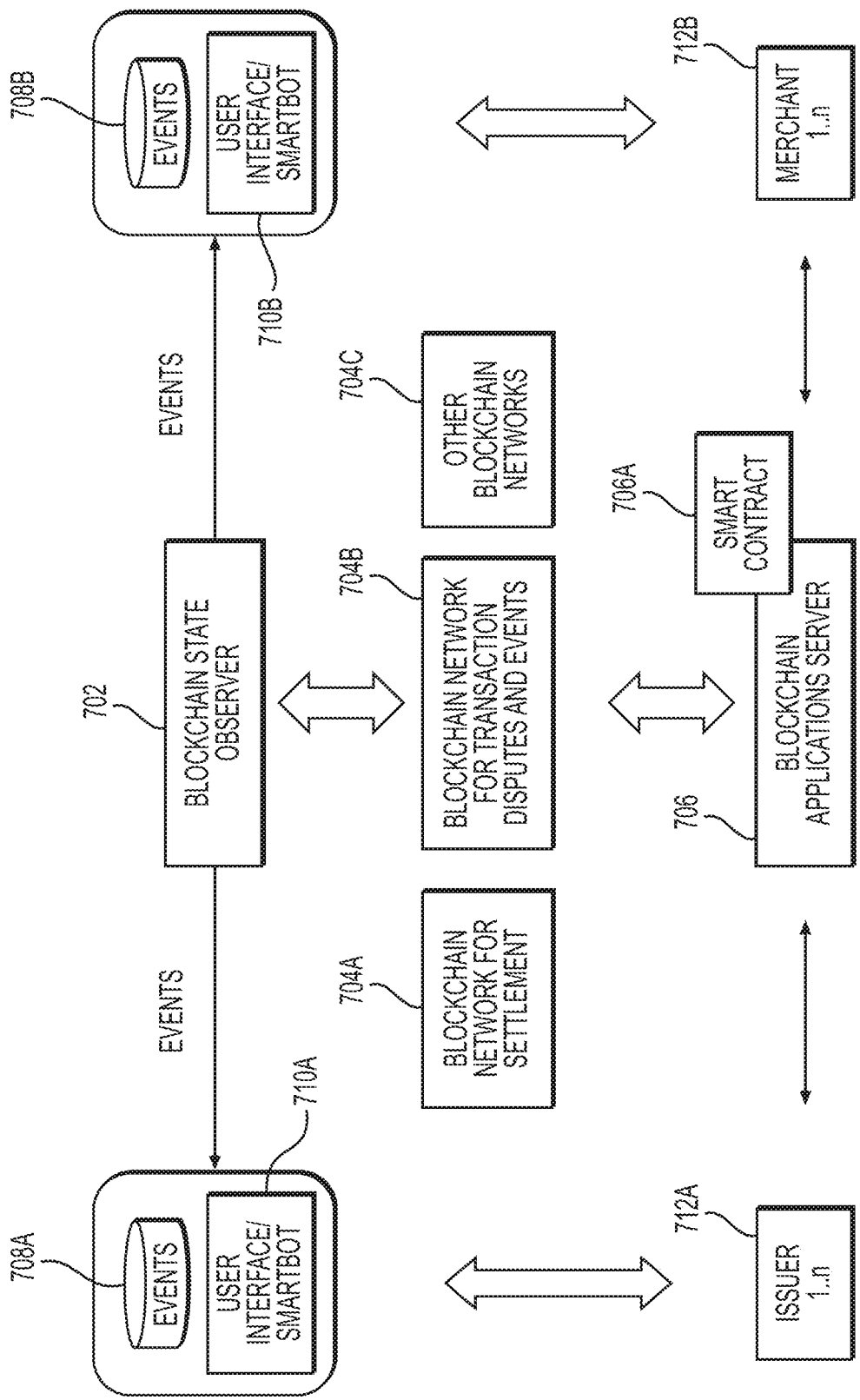
FIGS. 7A-7B depict an exemplary flow diagram of two blockchain networks used in the management of payment transactions, alerts, dispute settlement, and settlement payment, using smart contracts, in accordance with non-limiting embodiments.
Figure 7B:
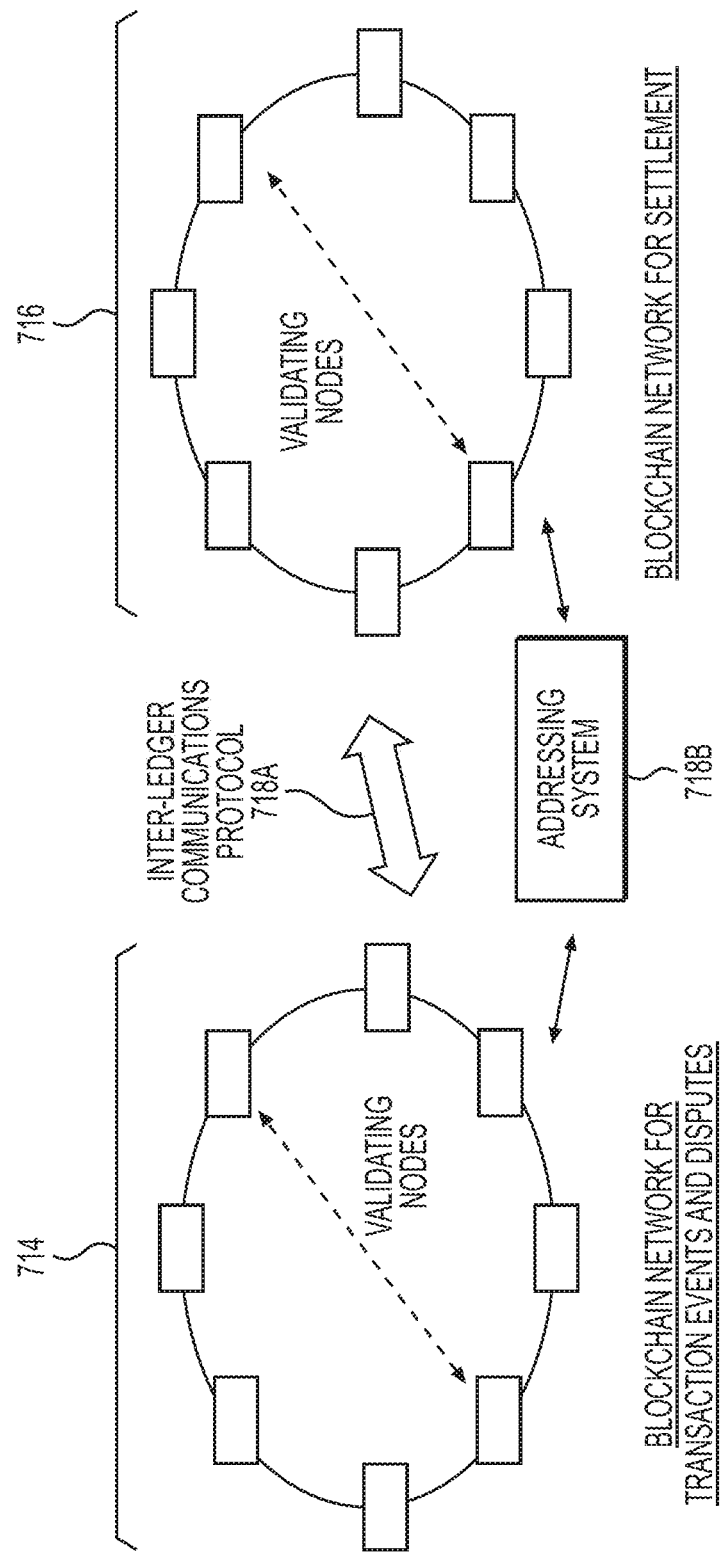

FIGS. 7A-7B depicts an exemplary flow diagram of at least two blockchain networks used in the management of payment transactions, alerts, dispute settlement, and settlement payment, using smart contracts, in accordance with non-limiting embodiments. For example, referring to FIG. 7A, a blockchain network for transaction events and disputes 704B may record sequential events of a payment transaction, from the origination at a merchant by a consumer to the final processing. The recordation of each event may be made to a shared ledger of the blockchain network for transaction events and disputes 704B, which allows for permanence, encryption, and proof-of-work, as known to persons having ordinary skill in the art. Thus, blockchain network for transaction events and disputes 704B may record events for any number of transactions involving a number of participants (e.g., issuer 1 . . . n 712A, merchants 1 . . . n 712B, consumer, acquirer, etc.), each transaction being based on and/or trackable via a transaction identifier. Blockchain network for transaction events and disputes 704B may be one of a number of blockchain networks (e.g., of a hyperledger blockchain system). A blockchain network for settlement 704A may be a real time gross settlement system that records the final transfer of funds, tokens, currency, or cryptocurrency between transacting parties (e.g., issuer 712A and merchant 712B). The shared ledger of blockchain network for settlement 704A may be updated to reflect the new account balances of the transacting parties, following the processing of the transaction. Thus, blockchain network for settlement 704A may hold, at least the undisputed balance of, the accounts for its various member participants, for example, any number of issuers (e.g., issuer 1 . . . n 712A) and any number of merchants (e.g., merchants 1 . . . n 712B). One example of the blockchain network for settlement 704A is Ripple, a real-time gross settlement system that may enable a secure, instant, and nearly free financial transaction, which may support the use of currency, cryptocurrency (e.g., bitcoins, Litecoins, etc.), and/or commodities, based on a shared ledger. In some embodiments, the shared ledger of blockchain network for settlement 704A may overlap in member participants (nodes) or in the information recorded with blockchain network for transaction events and disputes 704B. Nevertheless, having distinct blockchain networks may help ensure privacy of information, integration with existing financial transaction regulations and standards, and a division of business functions.

Figure 8:
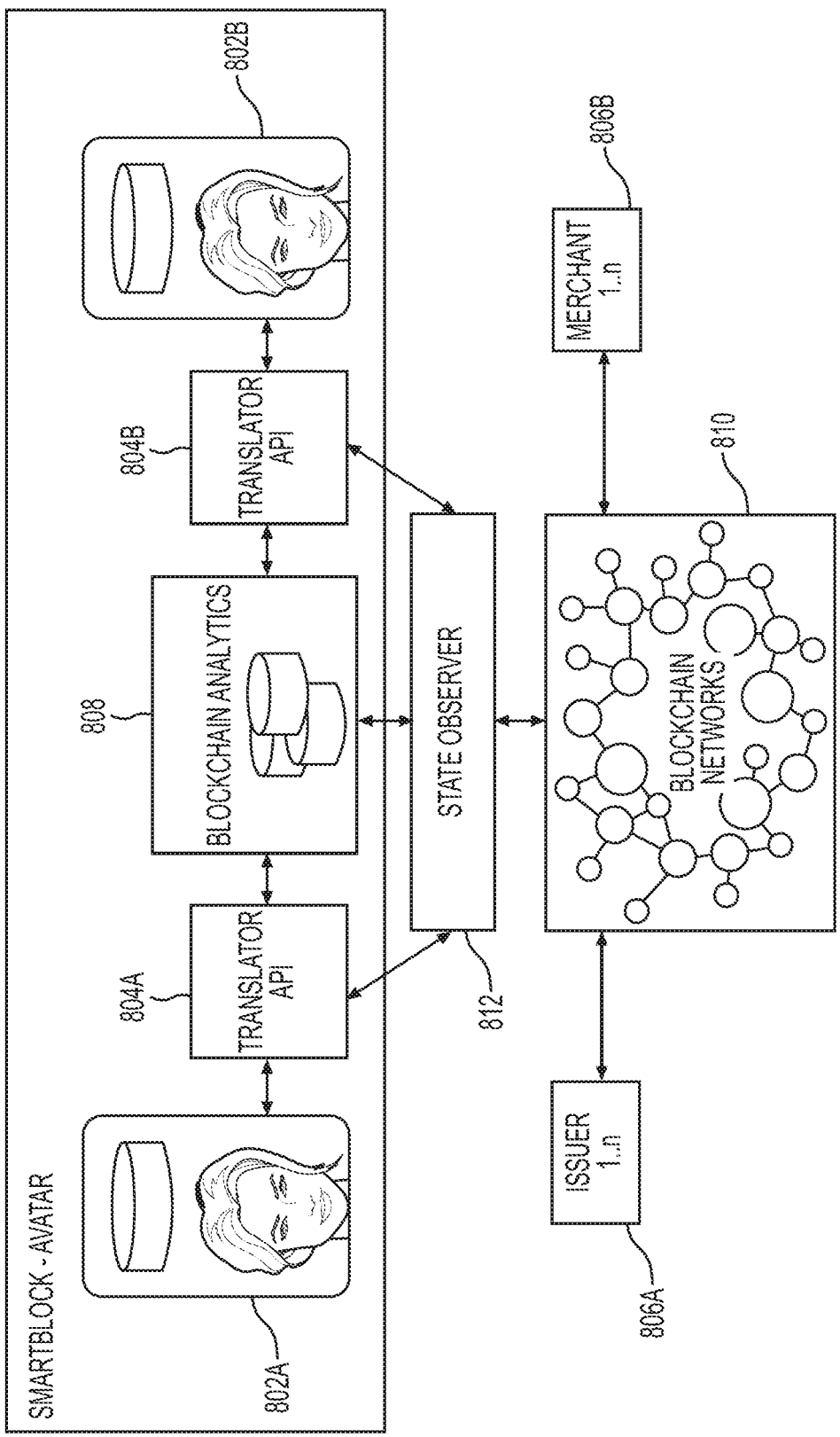
FIG. 8 depicts an exemplary flow diagram of an interactive bot feature of the user interface for analyzing transaction attributes and dispute information, using a blockchain state observer.
Figure 9:
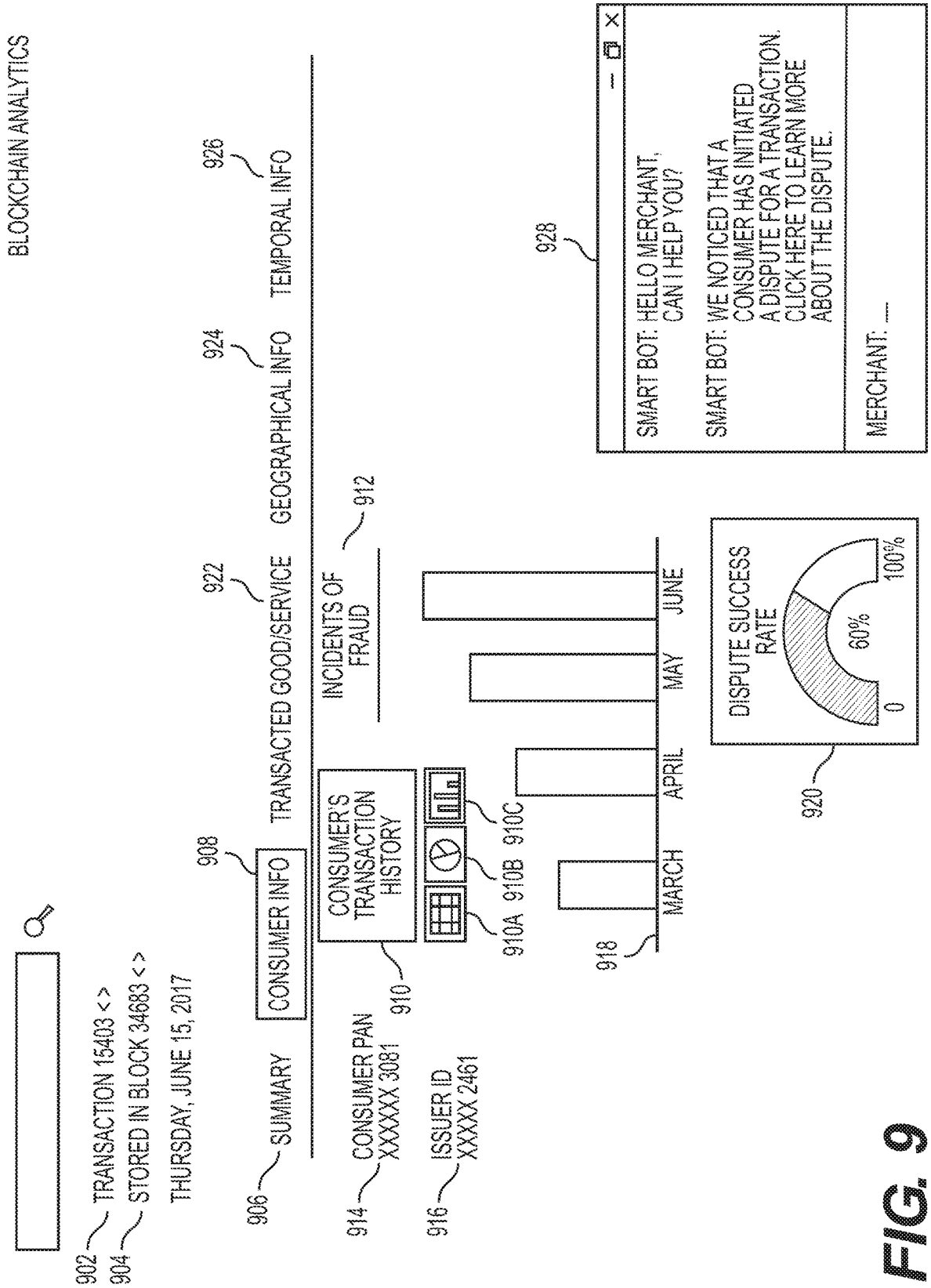
FIG. 9 depicts an exemplary screenshot of a user interface for analyzing transaction attributes and dispute information received from a blockchain state observer.

Thus, it is contemplated that there may be other blockchain networks 704C, serving other functions of a transaction. Blockchain state observer 702 may periodically or continually observe the blockchains for new updates (e.g., events 708A and 708B) for a payment transaction and present and/or make accessible information related to each update to the interested participants (issuer 1 . . . n 712A, merchant 1 . . . n 712B, etc.). The participants of the transaction may be informed of these events, analyze or research further based on these events, and/or enter input (e.g., initiate dispute, accept or reject dispute resolution results) using user interface on a user device or computing system (e.g., User Interface/SmartBots 710A and 710B). For example, a user may wish to analyze certain attributes of a transaction further using data analytics according to method 600 presented in FIGS. 6A-6B. Furthermore, as illustrated in FIGS. 8 and 9, and explained herein, the user interface may allow the user to utilize Smartbots to be able to be able to better interact with data presented. Inputs by a user may be entered via one or more applications, application servers or programs of the blockchain applications server 706 into the one or more blockchain networks. One of these applications is smart contract 706A, which may be stored in one or more blockchain networks.

FIG. 7B depicts a flow diagram for a method of communication and/or relaying of information between at least two blockchain networks of a hyperledger. Hyperledger may be designed so that there may be multiple blockchain networks each specializing on a specific business function with internetwork transactions between the blockchains using an inter-ledger communications protocol 718A and/or an addressing system 718B. The blockchain networks may include, for example, blockchain network for transaction events and disputes 714 and blockchain network for settlement 716, their functions having been described earlier. Before information or transactions events are entered, their proposed entries may be validated, e.g., by validating nodes or peers of the blockchain. The multiple blockchain networks may allow access to at least some information stored in each network, based on an addressing system 718B. In at least one embodiment, the addressing system may be a method of identifying information to be retrieved from a blockchain network by another blockchain network, through the use of an identifier, e.g., of a transaction participant, node, peer, or payment source account. A hyperledger's addressing system 718B may uses inter-ledger communication protocol 718A to discover and settle the disputes between parties. For example, the addresses of the merchants and issuers may be defined in the blockchain network for transaction events and disputes. Other information may also be transferred, for example, the transaction amount, and the beneficiary of the transfer. These information may be transmitted by inter-ledger communication to the blockchain network for settlement 716, so that it may leverage its specific role of transferring funds to the appropriate parties.

FIG. 8 depicts an exemplary flow diagram of an interactive bot feature of the user interface for analyzing transaction attributes and dispute information, using a blockchain state observer. The interactive bot ("SmartBot," "avatar," etc.), 802A and 802B, may be an artificial intelligence (AI) based application that can translate customer request and/or speech into system commands. The interactive bot, 802A and 802B, may available to the user of the user interface who seeks to view blockchain analytics data 808 generated from information in the blockchain 810. It is contemplated that this user may be a participant of the blockchain used in the transaction and dispute management system, and therefore this user may include, for example, an issuer 806A, or a merchant 806B.

The translator application program interface (API), 804A and 804B, may be the interface layer that may convert speech or text that is input by the user (e.g., an issuer 806A or a merchant 806B) via a user interface into commands that may retrieve information from or display various aspects of blockchain analytics 808. Furthermore, the blockchain analytics 808 may be generated based on the data that participants of the blockchain (e.g., issuers, consumers, merchants, and/or acquirers) add to the blockchain 810 and/or shared ledger via the blockchain user interface 812, for example, during a transaction or transaction dispute management. Furthermore, blockchain analytics 808 may be generated based on methods presented in FIG. 6A-6B. Thus, blockchain analytics 808 may be a system that takes structured and/or unstructured data from, blockchain disputes system and may slice and dice the data to provide actionable insights.

The interactive bot technology may be used to enhance and improve customer experience and anticipate the customer before the customer explicitly requests information. Thus, the interactive bot technology can be effective in areas where participants of a transaction or transaction dispute need to be educated on the process and when to anticipate a response.

Interactive bots 802A and 802B may be dependent on the blockchain analytics 808 to drive the optimal customer experience and may provide useful information to participants (e.g., merchant, issuer, etc.) of the blockchain who are able to view blockchain analytics via a user interface. For example, a user may be able to gather information on the mean times for response for a disputing party of a transaction dispute based upon historical data.

FIG. 9 depicts an exemplary screenshot of a user interface for analyzing transaction attributes and dispute information received from a state observer. Participants of a payment transaction, as members of one or more blockchain networks used in the systems and methods for transaction dispute management, as presented in various embodiments herein, may be able to view blockchain analytics on a user interface. The participants (e.g., issuer, merchant, acquirer, consumer, etc.) may include the parties of a transaction or a transaction dispute, and the blockchain analytics may be generated according to methods presented in FIGS. 6A-6B. As illustrated in an exemplary screenshot, the blockchain applications server may identify the original transaction 902, for which a user wishes to seek more information regarding one or more attributes of the transaction. Furthermore, the particular block 904 in which an attribute or transaction information is stored may also be identified. The user may be able to gain a summary 906 of the current transaction, or gain information on a particular attribute of the transaction. For example, a user may view information related to the consumer 908 of the transaction (or any other party of the transaction). As shown in FIG. 9, when selecting to gain more information about the consumer of the transaction, a user may be able to view, for example a consumer's transaction history 910, incidents of fraud 912, an encrypted identifier of the consumer's primary account number 914, an encrypted identifier of the user identification number 916. The user may be able to view the consumer's transaction history in multiple forms, e.g., tables 910A, pie charts 910B, bar graphs 910C, etc. A transaction history 910 of the consumer may display for example, the number of transactions conducted by the transaction over time 918. In some embodiments, the blockchain analytics performed and displayed by the blockchain applications server on the blockchain may also present a consumer's overall success rate 920 in transaction disputes, for example, to ascertain how difficult it is to overcome a dispute settlement process with a consumer. The user may also be able to detect incidents of fraud 912 resulting from the consumer, for example, to proactively avoid fraud by stopping a transaction with the consumer.

In other embodiments, the user may also view information related to the transacted good(s) and/or service(s) of the transaction 922, geographical information of the transaction 924, temporal information of the transaction 926, or any other attribute. The methods performed by the blockchain applications server of gaining more information for the various attributes of the current transaction from the blockchain may include gaining information on other transactions sharing the attribute, and may employ methods presented in FIGS. 6A-6B. In further embodiments, the user may also view information related to more than one attributes at a time. For example, blockchain analytics presented by the state observer may provide information on a consumer's transaction involving a particular good and/or service over time (from other merchants, for example). In another example, blockchain analytics presented by the state observer may be able to provide information on incidents of dispute arising from a particular participant of the blockchain over a particular transacted good or service. These information may be used, for example, to proactively identify and/or report fraud.

In some embodiments, the blockchain state observer, via the user interface (as shown in FIG. 9) on a user device may be able to enhance the user's experience in able to use blockchain analytics, via an interactive bot 928 (e.g., "SmartBot"). The interactive bot 928 may receive input from the user to direct the user towards finding the appropriate information from the blockchain analytics and/or use artificial intelligence (AI) technology to detect information about the user and proactively predict what the user may be looking for. The interactive bot may be implemented based on methods described in FIG. 9.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

It is intended that the specification and examples be considered as exemplary only, with a true scope and spirit of the invention being indicated by the following claims.

What is claimed is:

1. A computer-implemented method of hyperledger-based payment transactions, alerts, and dispute settlement, using smart contracts, the method comprising:
  receiving, by a user interface, a user input, the user input including speech;
  translating, by the user interface, the user input into a command based on a translation application program interface (API);

receiving, based on the command, transaction information comprising transaction data of transaction attributes for a transaction for goods or a service originating at a merchant, wherein the transaction data includes entries for the transaction attributes of (1) an identifier of an issuer of a payment source account of a consumer for applying resources to the transaction, (2) an identifier of an acquirer of a payment account of the merchant for depositing the applied resources for the transaction, (3) an amount of resources to be applied to the transaction, and (4) an identification of the goods or the service transacted;

storing the transaction data of the transaction attributes for the transaction, in data structures for transaction attributes of the transaction in a smart contract generated or updated by a smart contract application;

deploying, based on a smart contract API, the smart contract into one or more blockchain networks, wherein at least one of the one or more blockchain networks has a ledger that is accessible to at least one participant of the transaction, the at least one participant comprising at least the user, the merchant, issuer of the payment source account of the user, and the acquirer of the payment account of the merchant;

receiving, in a new data structure of the smart contract, from the at least one participant, an indication of a dispute of one or more transaction data of the transaction attributes of the transaction;

updating the smart contract based on the indication of the dispute of the one or more transaction data of the transaction attributes of the transaction;

executing a dispute settlement process using the updated smart contract application;

receiving, from the at least one participant, an input of a selection of goods or a service transacted for in the transaction for an analysis;

searching, based at least in part on the selection and the dispute information, the one or more blockchain networks for transaction amounts in other transactions associated with other merchants, other consumers, other issuers, or other acquirers involving the goods or the service transacted for in the transaction to detect a fraudulent party; and performing one or more iterations of enabling, using an inter ledger protocol, to transfer at least some of the transaction data of the transaction attributes of the transaction from the at least one of the one or more blockchain networks to another one of the one or more blockchain networks, wherein each of the one or more blockchain networks serves one or more business functions of the transaction, and the one or more business functions includes recording transaction events, settling the dispute as to the transaction data of a transaction attribute, and recording the transfer of the resources.

2. The method of claim 1, further comprising:

receiving in the new data structure of the smart contract, from the at least one participant a proposed change to the one or more transaction data of the transaction attributes of the transaction, wherein the new data structures update the smart contract;

deploying the updated smart contract into the one or more blockchain networks that has the ledger that is accessible to at least some of the at least one participant of the transaction;

prompting the at least one participant of the transaction to respond to the indication of the dispute by accepting or rejecting the proposed change;

if one of the at least one participant, other than the at least one participant from whom the indication of the dispute was received, rejects the proposed change, executing the dispute settlement process using the smart contract application, to determine a revised transaction information; and outputting the revised transaction information to the ledger.

3. The method of claim 2, wherein, the one or more blockchain networks into which the updated smart contract is deployed comprises a blockchain network for dispute settlement and has the ledger that is accessible to a predetermined subset of participants of the transaction; and if one of the at least one participant, other than the at least one participant from whom the indication of the dispute was received, rejects the proposed change, executing the dispute settlement process, using the smart contract application, to determine the revised transaction information further comprises:

enabling, using the inter ledger protocol, to transfer at least the disputed transaction data and the proposed change to the transaction data of the transaction attributes of the transaction to the blockchain network for dispute settlement, and to store the disputed transaction data and the proposed change to the transaction data into the ledger of the blockchain network for dispute settlement.

4. The method of claim 2, wherein executing the dispute settlement process, using the smart contract application, to determine the revised transaction information comprises:

generating a data structure in the ledger of the one or more blockchain networks to form an electronic contract governing the payment transaction, wherein the data structure includes fields for entering terms of the contract;

receiving the transaction data of the transaction attributes of the transaction and proposed changes to any disputed transaction data of the one or more transaction attributes into the fields of the generated data structure;

identifying one or more disputed transaction data of the transaction attributes based on the received transaction data and the proposed changes to the transaction data of the one or more transaction attributes; and executing a computerized transaction protocol to resolve the disputed transaction information, based on predetermined rules for determining a veracity of a disputed transaction data of the transaction attribute of the transaction.

5. The method of claim 1, wherein enabling, using the inter ledger protocol, to transfer at least some of the transaction data of the transaction attributes of the transaction to another one of the one or more blockchain networks further comprises:

enabling, using the inter ledger protocol, to transfer at least some of the transaction data of the transaction attributes of the transaction to a blockchain network for recording transaction events, and to store the at least some of the transaction data into the ledger of the blockchain network for recording transaction events, wherein the ledger of the blockchain network for recording transaction events is accessible to the at least one participant of the transaction; and enabling the user interface of each of the at least one participant of the transaction to perform one or more iterations of:
  identifying a new transaction event in a series of transaction events of the transaction stored in the blockchain network for recording transaction events, using the identifier of the at least one participant to access the stored transaction data, wherein a transaction event is a new transaction event if the transaction event has not been identified in a previous iteration; and
  presenting the new transaction event of the transaction on the user interface of the at least one participant, wherein the presentation enables the at least one participant to indicate the dispute of one or more attributes of the transaction or to query for information related to the new transaction event.

6. The method of claim 5, further comprising:
enabling the user interface of the at least one participant to:
  receive another input of the selection of the one or more transaction attributes of the transaction to analyze other transactions that have, as common, the selected one or more transaction attributes;
  search the one or more blockchain networks and compile a list of other transactions that have, as common, transaction data for the selected one or more transaction attributes;
  receive transaction data of other transaction attributes for each transaction of the list of other transactions; and
  generate and display, on the user interface of the at least one participant, an analytics report of the other transactions having, as common, transaction data for the selected one or more transaction attributes.

7. The method of claim 1, wherein performing one or more iterations includes:
  enabling, using the inter ledger protocol, to transfer at least some of the transaction data of the transaction attributes of the transaction to a blockchain network for processing the transfer of resources; and
  receiving, from the blockchain network for processing the transfer of resources, an indication of a transfer of funds between two or more participants, using identifiers of currency or cryptocurrency accounts of the two or more participants.

8. The method of claim 1, wherein the transaction attributes further comprise one or more of:
  an identifier of the merchant;
  an identifier of the consumer;
  an identifier of a currency or a cryptocurrency account of the at least one participant of the transaction;
  an itemization of the goods and/or services transacted for;
  any geographical and/or temporal information of the transaction;
  any taxes, tips, and/or gratuities;
  any discounts, coupons, reductions;
  any fees directed towards acquirers, issuers, payment networks; and
  currency exchange rates.

9. The method of claim 1, wherein the at least one participant of the transaction can access the ledger of one or more blockchain networks if the at least one participant obtains membership within the blockchain network as a peer by other validating peers.

10. A system for hyperledger-based payment transactions, alerts, and dispute settlement, using smart contracts, the system comprising:
  a data storage devices storing instructions for hyperledger-based payment transactions, alerts, and dispute settlement, using smart contracts;
  a user interface for each of at least one participant of the transaction; and
  one or more processors configured to execute the instructions to perform a method including:
    receiving, by the user interface, a user input, the user input including speech or text;
    translating, by the user interface, the user input into a command based on a translation API;
    receiving, based on the command, transaction information comprising transaction data of transaction attributes for a transaction for goods or a service originating at a merchant, wherein the transaction data includes entries for the transaction attributes of (1) an identifier of an issuer of a payment source account of a consumer for applying resources to the transaction, (2) an identifier of an acquirer of a payment account of the merchant for depositing the applied resources for the transaction, (3) an amount of resources to be applied to the transaction, and (4) an identification of the goods or the service transacted;
    storing the transaction data of the transaction attributes for the transaction, in data structures for transaction attributes of the transaction in a smart contract generated or updated by a smart contract application;
    deploying, based on a smart contract API, the smart contract into one or more blockchain networks, wherein at least one of the one or more blockchain networks has a ledger that is accessible to the at least one participant of the transaction, the at least one participant comprising at least the user, the merchant, issuer of the payment source account of the user, and the acquirer of the payment account of the merchant;
    receiving, in a new data structure of the smart contract, from the at least one participant, an indication of a dispute of one or more transaction data of the transaction attributes of the transaction;
    updating the smart contract based on the indication of the dispute of one or more transaction data of the transaction attributes of the transaction;
    executing a dispute settlement process using the updated smart contract application;
    receiving, from the at least one participant, an input of a selection of goods or a service transacted for in the transaction for an analysis;
    searching, based at least in part on the selection and the dispute information, the one or more blockchain networks for transaction amounts in other transactions associated with other merchants, other consumers, other issuers, or other acquirers involving the goods or the service transacted for in the transaction to detect a fraudulent party; and
    performing one or more iterations of enabling, using an inter ledger protocol, to transfer at least some of the transaction data of the transaction attributes of the transaction from the at least one of the one or more blockchain networks to another one of the one or more blockchain networks, wherein each of the one or more blockchain networks serves one or more business functions of the transaction, and the one or more business functions includes recording transaction events, settling dispute as to the transaction data of a transaction attribute, and recording the transfer of the resources.

11. The system of claim 10, wherein the one or more processors is further configured for:
receiving in the new data structure of the smart contract, from the at least one participant a proposed change to the one or more transaction data of the transaction attributes of the transaction, wherein the new data structures update the smart contract;
deploying the updated smart contract into the one or more blockchain networks that has the ledger that is accessible to at least some of the at least one participant of the transaction;
prompting the at least one participant of the transaction to respond to the indication of the dispute by accepting or rejecting the proposed change;
if one of the at least one participant, other than the at least one participant from whom the indication of the dispute was received, rejects the proposed change, executing the dispute settlement process using the smart contract application, to determine a revised transaction information; and
outputting the revised transaction information to the ledger.

12. The system of claim 11, wherein, the one or more blockchain networks into which the updated smart contract is deployed comprises a blockchain network for dispute settlement and has the ledger that is accessible to a predetermined subset of participants of the transaction; and
if one of the at least one participant, other than the at least one participant from whom the indication of the dispute was received, rejects the proposed change, executing the dispute settlement process, using the smart contract application, to determine the revised transaction information further comprises:
enabling, using the inter ledger protocol, to transfer at least the disputed transaction data and the proposed change to the transaction data of the transaction attributes of the transaction to the blockchain network for dispute settlement, and to store the disputed transaction data and the proposed change to the transaction data into the ledger of the blockchain network for dispute settlement.

13. The system of claim 11, wherein executing the dispute settlement process, using the smart contract application, to determine the revised transaction information of the transaction comprises:
generating a data structure in a ledger of one or more blockchain networks to form an electronic contract governing the payment transaction, wherein the data structure includes fields for entering terms of the contract;
receiving the transaction data of the transaction attributes of the transaction and proposed changes to any disputed transaction data of the one or more transaction attributes into the fields of the generated data structure;
identifying one or more disputed transaction data of the transaction attributes based on the received transaction data and the proposed changes to the transaction data of the one or more transaction attributes; and
executing a computerized transaction protocol to resolve the disputed transaction information, based on predetermined rules for determining a veracity of a disputed transaction data of a transaction attribute of a transaction.

14. The system of claim 10, wherein enabling, using the inter ledger protocol, to transfer at least some of the transaction data of the transaction attributes of the transaction to another one of the one or more blockchain networks further comprises:
enabling, using the inter ledger protocol, to transfer at least some of the transaction data of the transaction attributes of the transaction to a blockchain network for recording transaction events, and to store the at least some of the transaction data into the ledger of the blockchain network for recording transaction events, wherein the ledger of the blockchain network for recording transaction events is accessible to at least one participant of the transaction; and
enabling the user interface of each the at least one participant of the transaction to perform one or more iterations of:
identifying a new transaction event in a series of transaction events of the transaction stored in the blockchain network for recording transaction events, using an identifier of the at least one participant to access the stored transaction data, wherein a transaction event is a new transaction event if the transaction event has not been identified in a previous iteration; and
presenting the new transaction event of the transaction on the user interface of the at least one participant, wherein the presentation enables the at least one participant to indicate a dispute of one or more attributes of the transaction or to query for information related to the new transaction event.

15. The system of claim 14, further comprising:
enabling the user interface of the at least one participant to:
receive another input of the selection of the one or more transaction attributes of the transaction to analyze other transactions that have, as common, the selected one or more transaction attributes;
search the one or more blockchain networks and compile a list of other transactions that have, as common, transaction data for the selected one or more transaction attributes;
receive transaction data of other transaction attributes for each transaction of the list of other transactions; and
generate and display, on the user interface of the at least one participant, an analytics report of the other transactions having, as common, transaction data for the selected one or more transaction attributes.

16. The system of claim 10, wherein performing one or more iterations includes:
enabling, using an inter ledger protocol, to transfer at least some of the transaction data of the transaction attributes of the transaction to a blockchain network for processing the transfer of resources; and
receiving, from the blockchain network for processing the transfer of resources, an indication of a transfer of funds between two or more participants, using identifiers of currency or cryptocurrency accounts of the two or more participants.

17. The system of claim 10, wherein the transaction attributes further comprise one or more of:
an identifier of the merchant;
an identifier of the consumer;
an identifier of a currency or a cryptocurrency account of the at least one participant of the transaction;
an itemization of the goods and/or services transacted for;

any geographical and/or temporal information of the transaction;

any taxes, tips, and/or gratuities;

any discounts, coupons, reductions;

any fees directed towards acquirers, issuers, payment networks; and currency exchange rates.

18. The system of claim 10, wherein the at least one participant of the transaction can access the ledger of one or more blockchain networks if the at least one participant obtains membership within the blockchain network as a peer by other validating peers.

19. A non-transitory machine readable medium storing instructions that, when executed by a server, causes the server to perform a method for hyperledger-based payment transactions, alerts, and dispute settlement, using smart contracts the method including:

receiving, by a user interface, a user input, the user input including speech or text;

translating, by the user interface, the user input into a command based on a translation API;

receiving, based on the command, transaction information comprising transaction data of transaction attributes for a transaction for goods or a service originating at a merchant, wherein the transaction data includes entries for the transaction attributes of (1) an identifier of an issuer of a payment source account of a consumer for applying resources to the transaction, (2) an identifier of an acquirer of a payment account of the merchant for depositing the applied resources for the transaction, (3) an amount of resources to be applied to the transaction, and (4) an identification of the goods or the service transacted;

storing the transaction data of the transaction attributes for the transaction, in data structures for transaction attributes of the transaction in a Smart contract generated or updated by a smart contract application;

deploying, based on a smart contract API, the smart contract into one or more blockchain networks, wherein at least one of the one or more blockchain networks has a ledger that is accessible to at least one participant of the transaction, the at least one participant comprising at least the user, the merchant, issuer of the payment source account of the user, and the acquirer of the payment account of the merchant;

receiving, in a new data structure of the smart contract, from the at least one participant, an indication of a dispute of one or more transaction data of the transaction attributes of the transaction;

updating the smart contract based on the indication of the dispute of one or more transaction data of the transaction attributes of the transaction;

executing a dispute settlement process using the updated smart contract application;

receiving, from the at least one participant, an input of a selection of goods or a service transacted for in the transaction for an analysis;

searching, based at least in part on the selection and the dispute information, the one or more blockchain networks for transaction amounts in other transactions associated with other merchants, other consumers, other issuers, or other acquirers involving the goods or the service transacted for in the transaction to detect a fraudulent party; and performing one or more iterations of enabling, using an inter ledger protocol, to transfer at least some of the transaction data of the transaction attributes of the transaction from the at least one of the one or more blockchain networks to another one of the one or more blockchain networks, wherein each of the one or more blockchain networks serves one or more business functions of the transaction, and the one or more business functions includes recording transaction events, settling the dispute as to the transaction data of a transaction attribute, and recording the transfer of the resources.

20. The non-transitory machine readable medium of claim 19, further comprising:

receiving in the new data structure of the smart contract, from the at least one participant, a proposed change to the one or more transaction data of the transaction attributes of the transaction, wherein the new data structures update the smart contract;

deploying the updated smart contract into one or more blockchain networks that has a ledger that is accessible to at least some of the at least one participant of the transaction;

prompting the at least one participant of the transaction to respond to the indication of the dispute by accepting or rejecting the proposed change;

if one of the at least one participant, other than the at least one participant from whom an indication of a dispute was received, rejects the proposed change, executing the dispute settlement process using the smart contract application, to determine a revised transaction information; and outputting the revised transaction information to the ledger.

* * * * *